(12) United States Patent
Li et al.

(10) Patent No.: US 12,358,250 B2
(45) Date of Patent: Jul. 15, 2025

(54) USE OF A MOISTURE RESERVOIR FOR RETREADING

(71) Applicant: BRIDGESTONE BANDAG, LLC, Muscatine, IA (US)

(72) Inventors: Yichen Li, San Ramon, CA (US); Robert G. Otting, Illinois City, IL (US); David L. Bender, Muscatine, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 0 days.

(21) Appl. No.: 17/914,017

(22) PCT Filed: Mar. 10, 2021

(86) PCT No.: PCT/US2021/021714
§ 371 (c)(1),
(2) Date: Sep. 23, 2022

(87) PCT Pub. No.: WO2021/194749
PCT Pub. Date: Sep. 30, 2021

(65) Prior Publication Data
US 2023/0119839 A1    Apr. 20, 2023

Related U.S. Application Data

(60) Provisional application No. 63/000,103, filed on Mar. 26, 2020.

(51) Int. Cl.
*B29D 30/56* (2006.01)
*B29D 30/54* (2006.01)

(52) U.S. Cl.
CPC .......... *B29D 30/542* (2013.01); *B29D 30/56* (2013.01); *B29D 2030/544* (2013.01)

(58) Field of Classification Search
CPC ...... B29D 30/52; B29D 30/54; B29D 30/542; B29D 30/544; B29D 30/56; B29D 2030/523
See application file for complete search history.

(56) References Cited

U.S. PATENT DOCUMENTS 2,364,167 A    12/1944  Scott
3,325,326 A  *  6/1967  Schelkmann .......... B29D 30/56
                                                  156/96

(Continued)

FOREIGN PATENT DOCUMENTS

CH           91260      10/1921
CN        103481518      2/2016

(Continued)

OTHER PUBLICATIONS

Machine translation of JP 2005281521; Document puplished Oct. 13, 2005.*

(Continued)

*Primary Examiner* — Steven D Maki

(57) ABSTRACT

A method of retreading a tire. The method includes the steps of applying a primer to an inner surface of a circumferential tread and applying the primer to an outer surface of a tire casing; applying an adhesive to the primer disposed on the inner surface and the primer disposed on the outer surface; applying the circumferential tread to the tire casing so the inner surface contacts the outer surface and a bondline edge forms circumferentially about the tire casing proximate to a shoulder area of the tire casing; and coupling a moisture reservoir to the circumferential tread proximate to the bondline edge.

15 Claims, 8 Drawing Sheets

(56) References Cited

U.S. PATENT DOCUMENTS

| | | | | |
|---|---|---|---|---|
| 3,730,801 | A | * | 5/1973 | Martin ............... B29D 30/542 |
| | | | | 156/128.6 |
| 4,090,901 | A | | 5/1978 | Baatz |
| 4,105,482 | A | | 8/1978 | Wapelhorst et al. |
| 4,157,369 | A | | 6/1979 | Doyle |
| 4,390,678 | A | | 6/1983 | Labelle et al. |
| 4,399,852 | A | | 8/1983 | Hausch |
| 4,424,088 | A | * | 1/1984 | Durif .................. B29D 30/54 |
| | | | | 156/286 |
| 4,453,997 | A | * | 6/1984 | Hori ...................... C09J 7/10 |
| | | | | 156/332 |
| 4,500,375 | A | | 2/1985 | Goldstein |
| 4,588,460 | A | | 5/1986 | Magee et al. |
| 4,662,834 | A | | 5/1987 | Magee |
| 5,462,617 | A | * | 10/1995 | Bender ............... C08G 18/10 |
| | | | | 156/96 |
| 2010/0032093 | A1 | * | 2/2010 | Braun ................ F16B 47/003 |
| | | | | 24/304 |
| 2010/0068530 | A1 | * | 3/2010 | Laubry ................. B32B 25/08 |
| | | | | 428/423.9 |
| 2011/0056627 | A1 | | 3/2011 | Argenzia, Jr. |
| 2014/0060730 | A1 | * | 3/2014 | Pan ..................... B29C 66/326 |
| | | | | 156/394.1 |
| 2014/0251527 | A1 | * | 9/2014 | Colby ................... B60C 11/02 |
| | | | | 156/95 |

FOREIGN PATENT DOCUMENTS

| | | | |
|---|---|---|---|
| DE | 10 2018 203 965 A1 | | 9/2019 |
| DE | 10-2018-203965 | | 9/2019 |
| EP | 3 072 673 | | 9/2016 |
| GB | 0 746 375 | | 3/1956 |
| JP | 2005-146126 A | * | 6/2005 |
| JP | 2005-281521 A | * | 10/2005 |
| JP | 2012-246432 A | * | 12/2012 |
| KR | 10-1998-0022624 | | 7/1998 |
| KR | 19980022624 A | | 7/1998 |
| WO | WO-2012/150948 A1 | | 11/2012 |

OTHER PUBLICATIONS

Machine translation for Japan 2012-246432 (Year: 2024).*
Machine translation for Japan 2005-146126 (Year: 2024).*
International Search Report and Written Opinion for PCT Application No. PCT/US2021/021714, dated Jul. 1, 2021.
MiningSafety.co.za, Maintenance Guide for Earthmover Tyres: Tyre Retreading, webpage available at https://www.miningsafety.co.za/maintenance-guide-for-earthmover-tyres-tyre-retreading/, (c) 2019, last accessed Oct. 24, 2019.
Office Action for BR Application No. 112022019228-2, dated Jan. 23, 2024.
Supplementary European Search Report for EP Application No. EP21774481, dated Mar. 14, 2024.

* cited by examiner

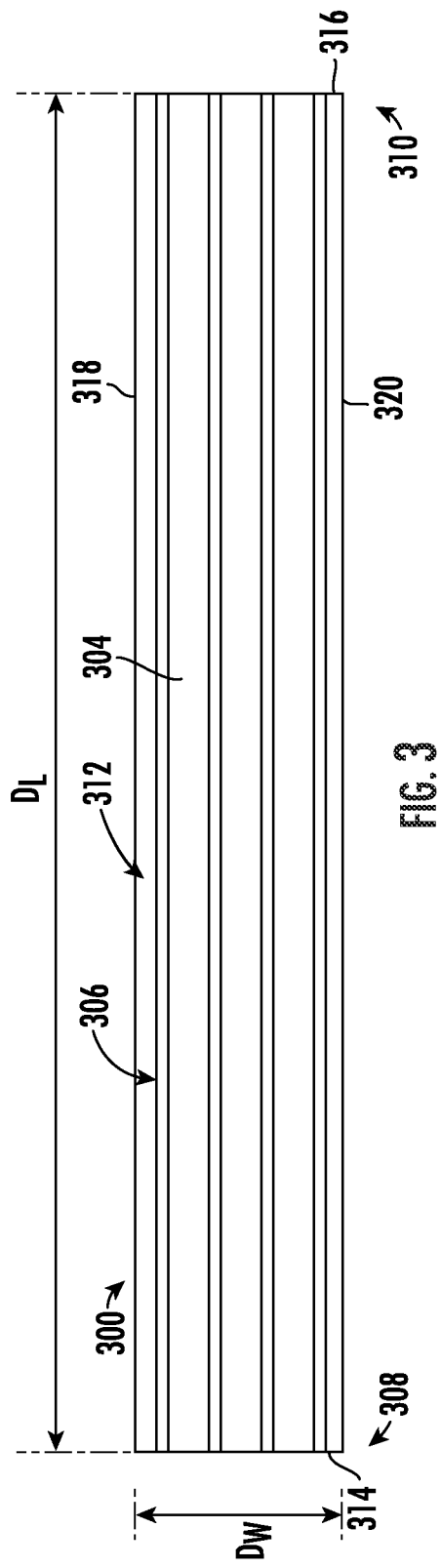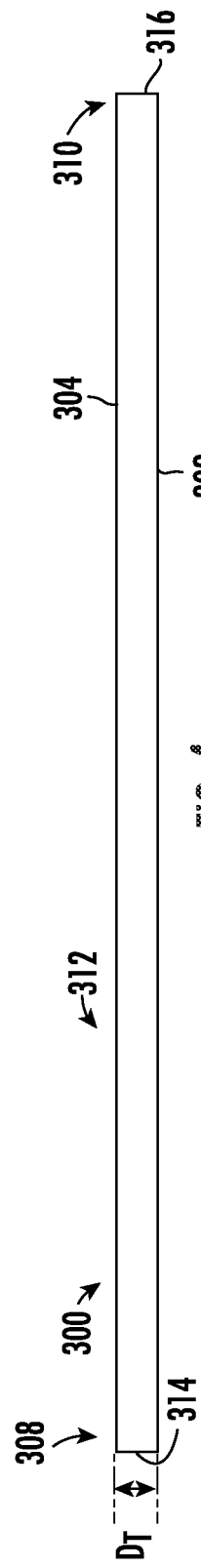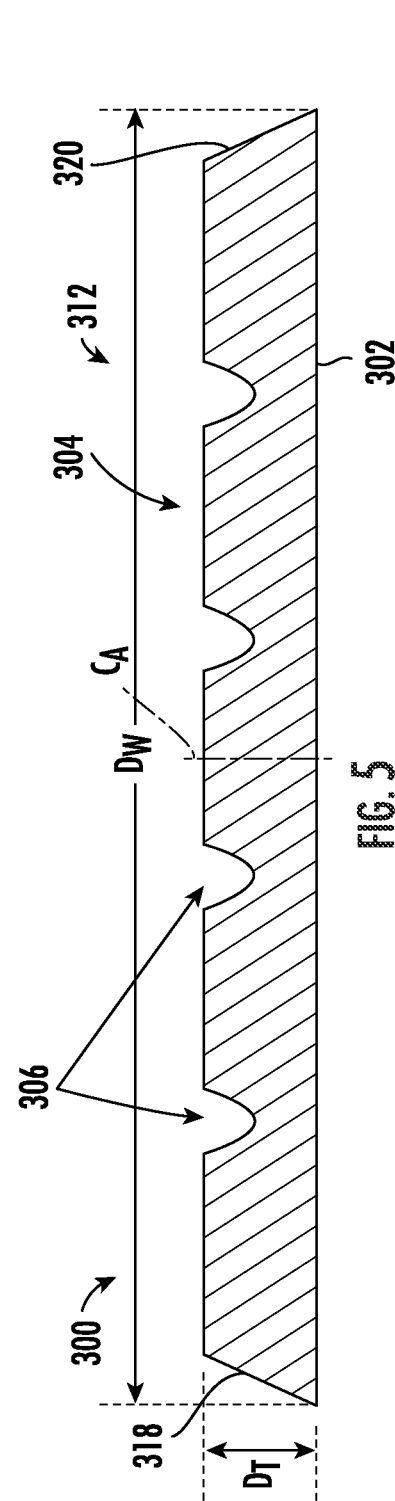

USE OF A MOISTURE RESERVOIR FOR RETREADING

CROSS-REFERENCE TO RELATED PATENT APPLICATIONS

This application is a U.S. National Phase of International Application No. PCT/US2021/021714, filed on Mar. 10, 2021, which claims priority to and the benefit of U.S. Provisional Application No. 63/000,103, filed on Mar. 26, 2020, the entire contents of which are incorporated herein by reference.

BACKGROUND

Retreaded tires provide an economical way to gain additional use from tire casings after the original tread or retread has become worn. According to a conventional method of retreading, sometimes referred to as cold process retreading, worn tire tread on a used tire is removed to create a buffed, treadless surface about the circumference of the tire casing to which a new layer of tread may be bonded.

The tire casing is then typically inspected for injuries, some of which may be skived and filled with a repair gum while others may be severe enough to warrant rejection of the casing. Next, a layer of cement is applied, followed by a layer of cushion gum may be applied to the back, i.e., the inside surface of a new layer of tread, or alternatively, the layer of cushion gum may be applied directly to the tacky surface on the tire casing. Conventionally, the cushion gum is a layer of uncured rubber material. The cushion gum and tread may be applied in combination about the circumference of the tire casing to create a retreaded tire assembly for curing. As an alternative, a length of tire tread may be wrapped around the tire casing with the cushion gum already applied. The cushion gum may form the bond between the tread and the tire casing during curing.

New tread for precured retreading applications is typically molded as a single piece with the tread pattern on one side and cement applied to the other side of the tread. Such treads are sometimes referred to a precured tread. The casing may be trimmed to fit the width of the precured tread. After the new precured tread is applied, a roller pressing process, commonly referred to as stitching, is next performed on the assembly to force air from between the tread strip and casing.

Following assembly of the tire casing, cement, cushion gum, and a precured tire tread strip, the overall retreaded tire assembly may be placed within a flexible rubber envelope. An airtight seal may be created between the envelope and the beads of the tire. The entire envelope tire assembly may be placed within a curing chamber and subjected to a vulcanization process that binds the materials together.

One issue that can frustrate a retread process is that the required amount of capacity of the curing chambers may not be available. In such an instance, it may be difficult or impossible to reach the curing conditions required for vulcanizing rubber, cement, or cushion gum. Curing chambers may also be expensive and present safety concerns, and thus it may be desirable to retread a tire without using a curing chamber.

SUMMARY

According to a first set of embodiments, a method of retreading a tire is provided. The method includes the steps of applying a primer to an inner surface of a circumferential tread and applying the primer to an outer surface of a tire casing; applying an adhesive to the primer disposed on the inner surface and the primer disposed on the outer surface; applying the circumferential tread to the tire casing so the inner surface contacts the outer surface and a bondline edge forms circumferentially about the tire casing proximate to a shoulder of the tire casing; and coupling a moisture reservoir to the circumferential tread proximate to the bondline edge.

According to a second set of embodiments, a method of retreading a tire is provided. The method includes the steps of applying a primer to an inner surface of a circumferential tread and applying the primer to an outer surface of a tire casing; applying an adhesive to the primer disposed on the outer surface; applying the circumferential tread to the tire casing; coupling a moisture reservoir to the circumferential tread; and enclosing the tire casing, the circumferential tread, and the moisture reservoir in an envelope.

According to a third set of embodiments, a method of retreading a tire is provided. The method includes the steps of forming a precured tire tread having a first end and a second end; splicing the first end and the second end to form a circumferential tread having an inner surface and a road-contacting outer surface; applying a primer to the entirety of the inner surface; applying a moisture-curing adhesive to the entirety of the inner surface; applying the circumferential tread to a tire casing so a bondline edge forms circumferentially about the tire casing; enclosing the circumferential tread, the tire casing, and a moisture reservoir within an envelope; positioning the moisture reservoir proximate the bondline edge within the envelope; and vacuuming air out of the envelope to apply a pressure to the circumferential tread in a direction generally toward the tire casing.

Various embodiments discussed herein provide a method of retreading a tire without using a curing chamber or heating oven. The method may include using an adhesive with a curing process facilitated by the presence of moisture, and the method may include positioning a moisture reservoir proximate the adhesive during the curing process.

BRIEF DESCRIPTION OF THE DRAWINGS

FIG. 3 is a top view of a precured tire tread according to an embodiment.

FIG. 4 is a side view of the precured tire tread of FIG. 3.

FIG. 5 is a cross-section view of the precured tire tread of FIG. 3.

DETAILED DESCRIPTION

Figure 1:
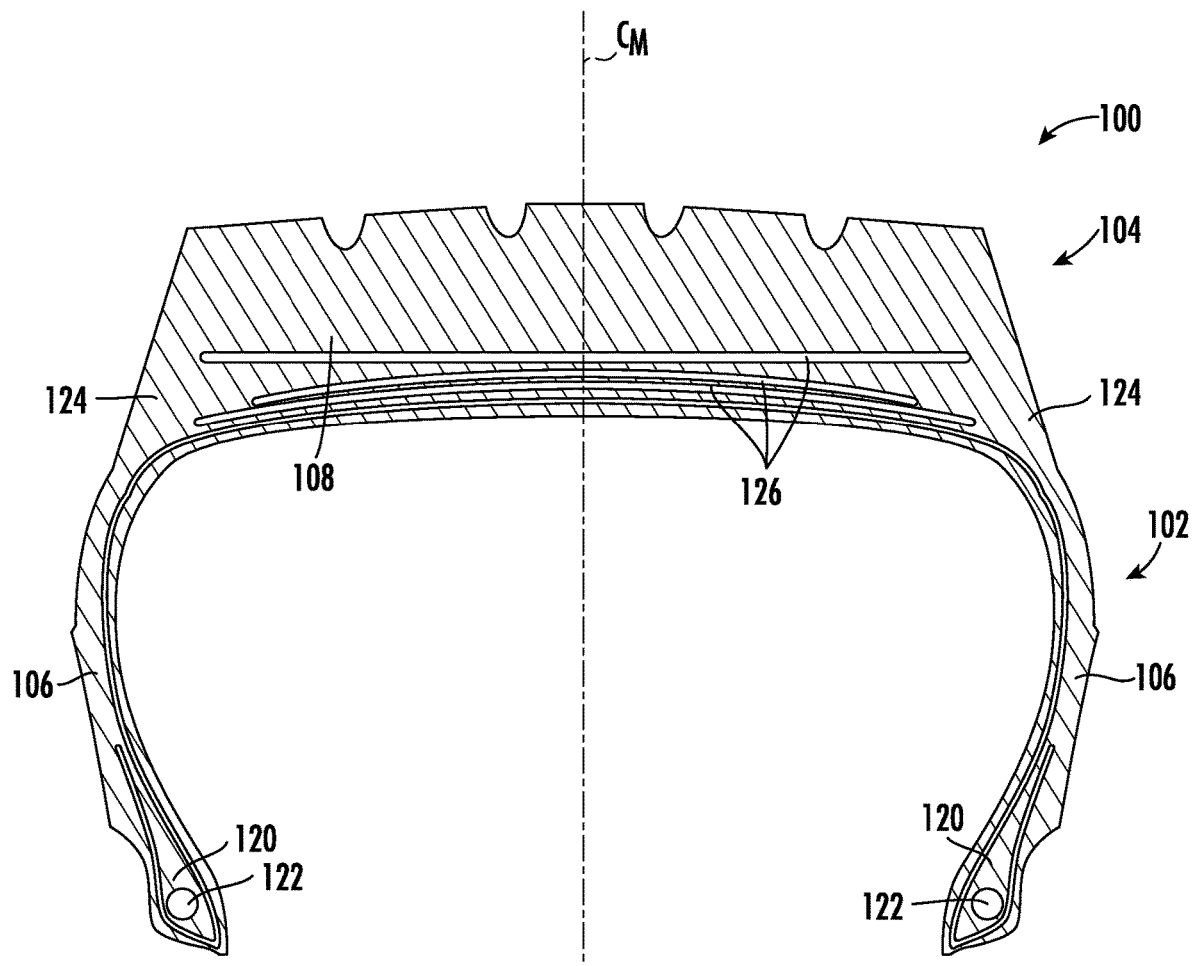
FIG. 1 is a cross-section view of a tire according to an embodiment.

Following below are more detailed descriptions of various concepts related to, and implementations of, retreading a tire. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Tires are used in various applications and under a variety of circumstances. Some tires may be designed to withstand the forces of a landing aircraft. Some tires may be designed to provide extra grip on surfaces covered in snow and ice. Some tires may be manufactured to be more suited to be repairable and retreaded.

Retread tires are used in applications ranging from aircraft landing gear to long-haul tractor-trailers. Retread tires are used all over the world, including remote locations where access to conventional equipment required to retread a tire casing, and more specifically a curing chamber required to vulcanize rubber, may not be readily available. As such, there is a need for a method of retreading a tire without the use of a curing chamber. In such an instance, it may be difficult or impossible to reach the curing conditions (e.g., temperature, pressure, humidity, etc.) required for vulcanizing rubber, cement, or cushion gum.

In some instances, it may be desirable to use an adhesive (e.g., liquid adhesive, etc.) that cures at room temperature to bind (e.g., couple, vulcanize, adhere, etc.) the precured tire tread to the tire casing. The adhesive may be a moisture-curing adhesive that relies on moisture (e.g., water) to cure the adhesive and bind the precured tire tread to the tire casing. For example, the tire casing and the precured tire tread may be primed with a primer that is structured to prepare the binding surfaces for acceptance of the adhesive. The adhesive may then be applied to one or both of the binding surfaces, and then the precured tire tread may be applied to the tire casing, forming a retreaded tire assembly.

When the retreaded tire assembly is placed within a flexible rubber envelope, there may not be enough moisture within the envelope to cure the moisture-curing adhesive and bind the precured tire tread to the tire casing.

To alleviate this deficiency, it may be desirable to place a moisture reservoir within the envelope while the retread tire assembly, and more specifically the adhesive, is curing. The moisture reservoir may include a predetermined amount of moisture required for curing the adhesive. The moisture reservoir may be a towel, cloth, felt, or similar textile able to absorb the predetermined amount of moisture required for curing the adhesive. The towel or cloth may be coupled to the retread tire assembly prior to placing the retread tire assembly in the envelope. The towel or cloth may be coupled to the precured tire tread, such as by using fasteners or an adhesive. In some embodiments, the moisture reservoir may be interposed between the envelope and the retreaded tire assembly after the retreaded tire assembly is placed within the envelope.

Positioning a moisture reservoir proximate to the edges of a bondline formed between the precured tire tread and the tire casing may decrease the amount of time required to cure the adhesive and thus cure the precured tire tread to the tire casing. Further, using an adhesive allows the cold process retreading to be a continuous process instead of a batch process. Because the adhesive can be cured without using a curing chamber—a common bottleneck in the retreading process—tires can be retread continuously, one after another. This also reduces the amount of energy required to retread tires, as curing chambers may require great amount of power to operate. And finally, curing the adhesive using a moisture reservoir enables small-volume retreading operations. For example, it may not be cost-effective to operate a curing chamber to cure a single tire. However, when using a moisture reservoir, a single tire may be retreaded without incurring the losses associated with operating a curing chamber for a single tire.

Curing chambers may be undesirable or ill-equipped for retreading larger tires, such as those used on earth-moving equipment, construction equipment, and farming equipment.

II. Terms

As used herein, the term "precured" refers to a material that is cured. Conversely, "uncured" refers to materials that are in their raw form and have not been cured. For example, curing an uncured material results in a cured or precured material.

As used herein, the term "precured tire tread" refers to a tire tread or BUILD-UP™ (e.g., precured product having no tread pattern thereon; blank; slick) that is separate from (e.g., not cured to) a tire casing. The combination of the precured tread cured to the tire casing forms a tire. The precured tire tread may take the form of a strip, oval, circle, ring, or similar shape. A precured tire tread may include materials and features such as, but not limited to, studs, reinforcing fabrics, Kevlar, nylon, cords, and similar features and materials.

As used herein, the term "retreaded tire assembly" refers to a PCT assembly applied to a tire casing with an uncured adhesive interposed between the mating surfaces. The retreaded tire assembly may be ready to be positioned within an envelope for curing. Once a retreaded tire assembly has been cured, it becomes a tire.

III. Example Retread

FIGS. 1-14 depict an example method of retreading a tire 100 (e.g., an original tire, a new tire, a previously retread or repaired tire, etc.) without the use of a curing chamber (e.g., curing oven, heating oven, etc.). Referring specifically to FIG. 1, the tire 100 includes a tire casing 102 (e.g., tire carcass, etc.) and a tire tread 104. As shown, the tire 100 is a radial tire; however, the retreading process may be completed on other types of tires, such as bias ply tires.

In the illustrated embodiment, the tire 100 includes a pair of side walls 106 bounded by a generally radial outer wall 108 (e.g., crown, etc.) that spans the side walls 106. Each of the side walls 106 extend radially inward from outer wall 108 and terminates at a bead area 120, the bead area 120 structured for mounting on a tire rim (not shown). The bead area 120 may be designed in a variety of configurations depending on, for example, tire type, tire size, or rim configuration. In the illustrated embodiment, the bead area 120 may also include a bead bundle 122. The bead bundle 122 may include, for example, metal strands or wires to improve the strength of the bead area 120.

The side walls 106 may include multiple layers, such as a rubber layer, a radial ply, and an inner liner which cooperate to provide the strong and flexible side walls 106. The side walls 106 are joined to the outer wall 108 and the tire tread 104 through a pair of shoulder areas 124. The shoulder areas 124 are contiguous with the side walls 106 and the outer wall 108. In some embodiments, the shoulder areas 124 are contiguous with the tire tread 104. The outer wall 108 may be strengthened by a plurality of belts 126 extending circumferentially about the tire casing 102 within the outer wall 108.

Speaking generally, after the tire tread 104 of the tire 100 wears beyond a certain limit, the tire 100 must either be discarded, re-grooved, or retreaded before it should be used on a vehicle for which it was designed. In cold process retreading, what remains of the tire tread 104 is removed from the tire casing 102 by a buffing machine through a buffing operation. During a buffing operation, the tire tread 104 is ground away from the tire casing 102, leaving a buffed tread mounting surface 128 (e.g., mounting surface, mating surface, bonding surface, curing surface, etc.) on the tire casing 102, as shown, for example, in FIG. 2. The mounting surface 128 extends circumferentially about the tire casing 102 and also extends transversely across the outer wall 108 until it terminates at the shoulder areas 124. When a PCT assembly is applied to the mounting surface 128, the interface between the mounting surface 128 and the PCT assembly may be referred to as a bondline. The bondline may have a width equal to the width of the mounting surface 128. In some embodiments, the bondline has a width less than the width of the mounting surface 128 as the PCT assembly applied to the tire casing 102 may have a width less than the width of the mounting surface 128 The bondline extends circumferentially about the tire casing 102 in between the mounting surface 128 and the PCT assembly. Edges of the bondline, shown as edges of the bondline 130 (e.g., a bondline edge), may be visible once a PCT assembly has been applied to the tire casing 102. In some embodiments, the edges of the bondline 130 are defined between the mounting surface 128 and the shoulder areas 124. In some embodiments, the edges of the bondline 130 may be visible after a PCT assembly has been cured to the tire casing 102. In some embodiments, the tire 100 includes the edges of the bondline 130, still visible once the tire 100 is applied to a rim of a vehicle. The edges of the bondline 130 may be parallel to each other (e.g., concentric, equidistant, etc.) and may extend circumferentially about the tire casing 102.

Figure 2:
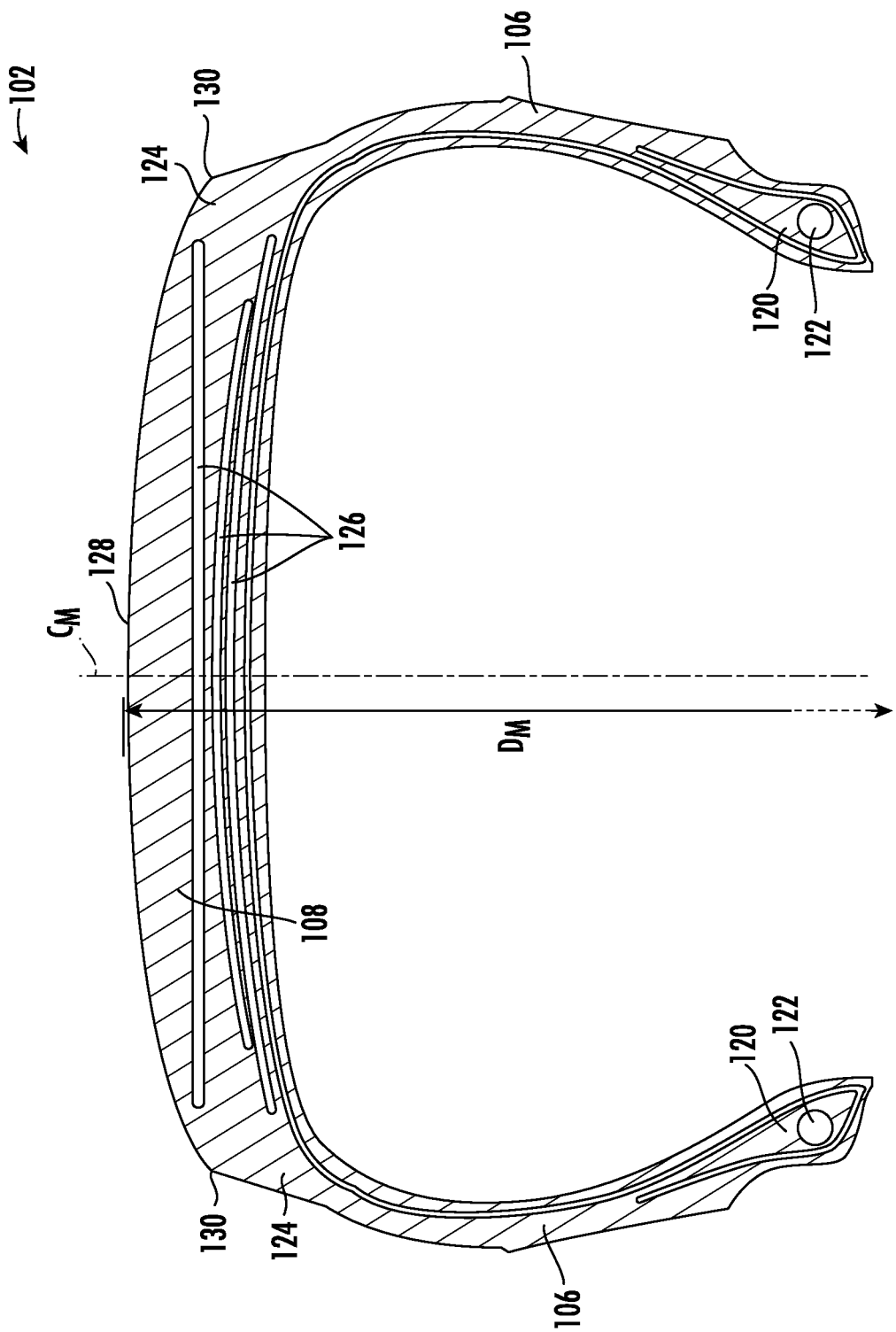
FIG. 2 is a cross-section view of a portion of the tire of FIG. 1.

The mounting surface 128 defines a diameter, shown as a casing diameter $D_M$. As shown in FIG. 2, the mounting surface 128 exhibits a curvature between the shoulder areas 124. Thus, the casing diameter $D_M$ may be greater proximate a center line $C_M$ of the mounting surface 128 when compared to the casing diameter $D_M$ proximate the edges of the bondline 130. In some embodiments, the mounting surface 128 is buffed to a slightly rounded (e.g., toroidal) radius extending between the shoulder areas 124. In some embodiments, the mounting surface 128 is flat such that the casing diameter $D_M$ is generally the same at all points between the edges of the bondline 130.

Referring still to FIG. 2, the tire 100 is shown after the buffing operation where the tire tread 104 has been removed. In some embodiments, a portion of the tire tread 104 may be left behind on the tire 100, such as if the user would like to increase a thickness of the outer wall 108 before applying a PCT assembly to the tire casing 102. As shown in FIG. 2, the tire tread 104 has been removed, leaving behind (e.g., exposing, revealing, etc.) the buffed tread mounting surface 128. After the tire tread 104 is removed and the mounting surface 128 is exposed, a process called skiving and filling may be performed on the tire casing 102. Skiving is the removal of damaged material or undesired material from the tire casing 102 prior to making a repair or performing a retread operation. Often, the tire casing 102 accumulates holes, nicks, punctures, or tears due to stones or other sharp objects the tire 100 comes in contact with during use. The injured or damaged area is first ground smooth by an appropriate grinding tool and then filled with repair gum (e.g., uncured rubber material). It is necessary to fill the injured areas to the level of the mounting surface 128 (e.g., such that the tread mounting surface 128 remains smooth) to avoid air pockets between the mounting surface 128 and a later-applied PCT assembly. Trapped air between the mounting surface 128 and the PCT assembly can have negative effects on the longevity of a typical retreaded tire (e.g., the tire 100). Following the skiving and filling operation, a building step occurs in which an adhesive (e.g., cushion gum, polyurethane adhesive, rubber cement, liquid adhesive, etc.) and a PCT assembly are applied to (e.g., wrapped around, placed on, stretched over, disposed about, etc.) the mounting surface 128.

Referring to FIGS. 3-5, a PCT assembly 300 is shown. The PCT assembly 300 may be formed of rubber, natural rubber, synthetic rubber, various polymers, and compounding ingredients, such as such as carbon black, silica, antidegradants, and zinc oxide, in order to produce the PCT assembly 300 having the desired end properties. The PCT assembly 300 may be formed in a strip having a tread width $D_W$ corresponding to a width of the mounting surface 128 between the shoulder areas 124. The PCT assembly 300 may define a tread length DL corresponding to the casing diameter $D_M$ (e.g., the tread length DT may be equal to a circumference of the mounting surface 128, the tread length DT may be equal to the circumference of the mounting surface 128 proximate the center line $C_M$). In some embodiments, the PCT assembly 300 is cut to have a tread length slightly less than (e.g., 3 inches less than) the circumference of the mounting surface 128 such that the PCT assembly 300 may be stretched over the tire casing 102. The PCT assembly 300 may further define a tread thickness, shown as a tread thickness DT. The PCT assembly 300 may include a mounting surface 302 (e.g., generally planar mounting surface, continuous surface, mating surface, binding surface, etc.) and an opposing surface 304 (e.g., generally planar opposing surface, road-contacting surface, tread surface, etc.). The mounting surface 302 may be configured such that the PCT assembly 300 may be applied to the corresponding mounting surface 128 on the tire casing 102. More specifically, the mounting surface 302 may be configured to be cured to the mounting surface 128 to form the tire 100. While the mounting surface 302 is shown as flat in FIGS. 4 and 5, in some embodiments, the PCT assembly 300 may include a mounting surface that is curved in order to match the curvature of the mounting surface 128. The opposing surface 304 may be configured to interface with a road surface and may include a plurality of grooves 306 designed to channel water and provide added traction during certain road and weather conditions.

In some embodiments, the PCT assembly 300 may include a reinforcing fabric layer (e.g., a reinforcing belt, a plurality of reinforcing fabric layers, etc.) positioned within the PCT assembly 300 between the mounting surface 302 and the opposing surface 304. In some embodiments, the PCT assembly 300 includes a reinforcing fabric layer coupled to and extending over the mounting surface 302, the reinforcing fabric layer structured to prevent foreign bodies (e.g., nails, sharp objects, glass, etc.) from penetrating the mounting surface 128 and damaging the tire casing 102. In some embodiments, the PCT assembly 300 includes a plurality of air passages (e.g., air channels) positioned across the mounting surface 302. The plurality of air passages may facilitate the removal of air from between the PCT assembly 300 and the tire casing 102 during a retreading process of the tire 100 (e.g., the tire casing 102). More specifically, the air passages may facilitate the removal of air from between the mounting surface 302 and the mounting surface 128.

The PCT assembly 300 may include a first PCT end 308 and a second PCT end 310. Extending between the first PCT end 308 and the second PCT end 310, and positioned on (e.g., profiled along, molded in, cut in, etc.) the opposing surface 304, may be a tread pattern 312 (e.g., a tread design, a series of treads, a tread pattern repetition, etc.). The tread pattern 312 may include a plurality of lugs, grooves, cuts, sipes, sipe cuts, and similar features. The tread pattern 312 may include the grooves 306.

The first PCT end 308 may include a first PCT end surface 314. The first PCT end surface 314 may be contiguous with both the mounting surface 302 and the opposing surface 304. In some embodiments, the first PCT end surface 314 may be perpendicular to the mounting surface 302. The second PCT end 310 may include a second PCT end surface 316. The second PCT end surface 316 may be contiguous with both the mounting surface 302 and the opposing surface 304. In some embodiments, the second PCT end surface 316 may be perpendicular to the mounting surface 302.

The PCT assembly 300 may further include a first PCT side 318 and a second PCT side 320 opposite the first PCT side 318. The first PCT side 318 may be parallel to the second PCT side 320. In some embodiments, the first PCT side 318 and the second PCT side 320 extend away from the mounting surface 302 in a direction generally toward a center line CA of the PCT assembly 300. When the PCT assembly 300 is applied to the tire casing 102 (e.g., the mounting surface 128), the first PCT side 318 and the second PCT side 320 may be positioned proximate the edges of the bondline 130. The interface between the mounting surface 128 and the mounting surface 302 may be referred to as a bondline. In some embodiments, after the mounting surface 302 is applied to the mounting surface 128, a portion of the mounting surface 128 may still show (e.g., not be covered by the PCT assembly 300) between the edges of the bondline 130 and the shoulder areas 124.

The PCT assembly 300 may be formed by extrusion. In some embodiments, the PCT assembly 300 is formed by molding. The PCT assembly 300 may be formed in a mold such that the tread pattern 312 proximate the first PCT end 308 is continued by the tread pattern 312 proximate the second PCT end 310 such that when the first PCT end 308 and the second PCT end 310 are coupled together, the tread pattern 312 is not interrupted by a break, but continues infinitely around a perimeter of the opposing surface 304.

Figure 6:
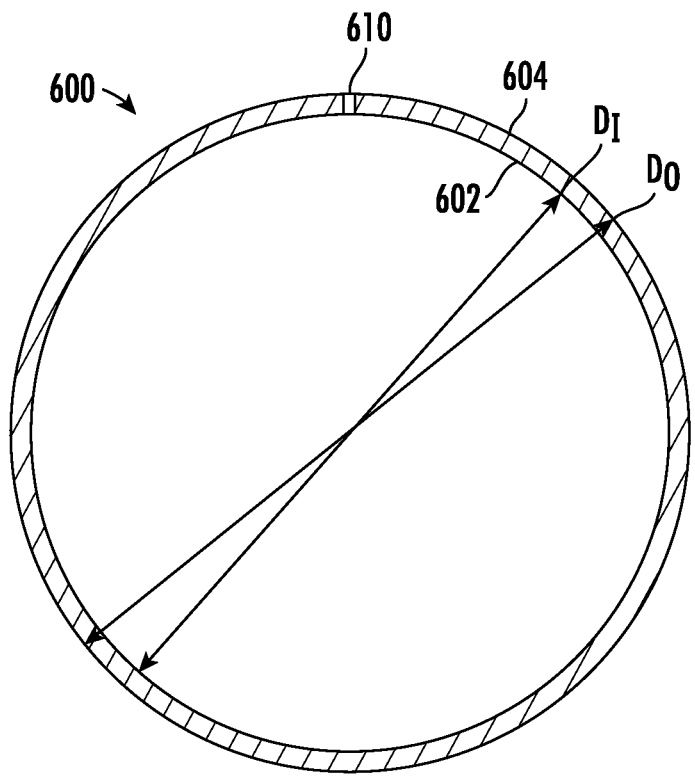
FIG. 6 is a side view of a precision circumferential tread according to an embodiment.

Referring now to FIG. 6, a precision circumferential tread (e.g., circumferential tread, annular tread, etc.) 600 is shown. The precision circumferential tread 600 is similar to the PCT assembly 300. A difference between the precision circumferential tread 600 and the PCT assembly 300 is that the precision circumferential tread 600 is formed as a ring (e.g., circle, hoop, cylinder, annular body, etc.). In some embodiments, the precision circumferential tread 600 is formed from the PCT assembly 300 by coupling (e.g., splicing) the first PCT end 308 to the second PCT end 310 such that the PCT assembly 300 forms a ring. More specifically, the precision circumferential tread 600 may be formed by coupling the first PCT end surface 314 to the second PCT end surface 316. In some embodiments, the first PCT end 308 and the second PCT end 310 may be hot spliced together (e.g., vulcanized together using unvulcanized rubber (e.g., a cushion gum), such as HD-30).

The precision circumferential tread 600 defines an inner surface 602 and an outer surface 604. The outer surface 604 is similar to the opposing surface 304. The outer surface 604 may be configured to interface with a road surface (e.g., asphalt, tarmac, cement, road, etc.) when the precision circumferential tread 600 is cured to the tire casing 102, and the tire 100 is mounted to a vehicle. The outer surface 604 may include a tread pattern, such as the tread pattern 312. In some embodiments, the tread pattern 312 may infinitely repeat around a circumference of the precision circumferential tread 600 (e.g., around the outer surface 604). The precision circumferential tread 600 further defines an inner diameter $D_I$ and an outer diameter Do.

Another difference between the PCT assembly 300 and the precision circumferential tread 600 is that the precision circumferential tread 600 includes a splice 610. The splice 610 is structured to form the inner surface 602 such that the inner surface 602 is circumferentially contiguous (e.g., is smooth, does not include a bump proximate the splice 610). In some embodiments, the splice 610 is structured to form the outer surface 604 such that the tread pattern 312 is infinitely repeating circumferentially about the circumference of the outer surface 604 (e.g., the tread pattern 312 is not interrupted, the tread pattern 312 has no beginning or end, etc.). In some embodiments, the splice 610 is structured to form the outer surface 604 such that the tread pattern 312 is discontinuous (e.g., non-repeating) at the splice 610. In some embodiments, the splice 610 is formed by a hot splicing process between two ends of a PCT assembly. In some embodiments, the splice 610 couples together the first PCT end 308 and the second PCT end 310. For example, a user may acquire the PCT assembly 300 and hot splice the ends together, forming the precision circumferential tread 600. In some embodiments, the splice 610 includes a cushion gum (e.g., uncured rubber, rope rubber, etc.) that has been cured using a curing process. For example, the cushion gum forming the splice 610 may be HD-30, a cushion gum having a curing temperature of 210° F. (degrees Fahrenheit). To hot splice the PCT assembly 300 to form the precision circumferential tread 600, the cushion gum may be applied to (e.g., spread on, stuck to, etc.) the first PCT end 308, and then the first PCT end 308 may be placed in contact with (e.g., coupled to, stuck to) the second PCT end 310. More specifically, the cushion gum may be applied to the first PCT end surface 314 and the second PCT end surface 316, and then the first PCT end surface 314 may be placed in contact with the second PCT end surface 316. An inherent tackiness (e.g., stickiness) of the cushion gum may hold the first PCT end 308 and the second PCT end 310 together prior to curing the cushion gum. The cushion gum may then be cured using a hot splicing machine. In some embodiments, the hot splicing machine includes a mold corresponding to the tread pattern 312 and the grooves 306 such that as the cushion gum cures, the cushion gum conforms to the mold and the tread pattern 312 is uninterrupted across the outer surface 604. In some embodiments, after the cushion gum is cured, the cushion gum is cut (e.g., using tools, knives, razors, skive, etc.) to match the tread pattern 312 on the outer surface 604 such that the tread pattern 312 is not interrupted. In some embodiments, the tread pattern 312 is interrupted (e.g., the tread pattern 312 is not infinitely continuous around the perimeter of the precision circumferential tread 600, such as by the splice 610 between the first PCT end 308 and the second PCT end 310.

In some embodiments, the first PCT end 308 and the second PCT end 310 may be coupled together using an adhesive, such as a liquid adhesive or a moisture-curable adhesive. More specifically, the first PCT end surface 314 and the second PCT end surface 316 may be bonded using an adhesive to form the precision circumferential tread 600.

The precision circumferential tread 600 may be formed of rubber. In some embodiments, the precision circumferential tread 600 my exhibit an inherent compliance such that the inner diameter $D_I$ may be operable between a relaxed inner diameter (e.g., the inner diameter $D_I$ shown in FIG. 6) and a stretched inner diameter, where the stretched inner diameter is greater than the relaxed inner diameter $D_I$.

Figure 7:
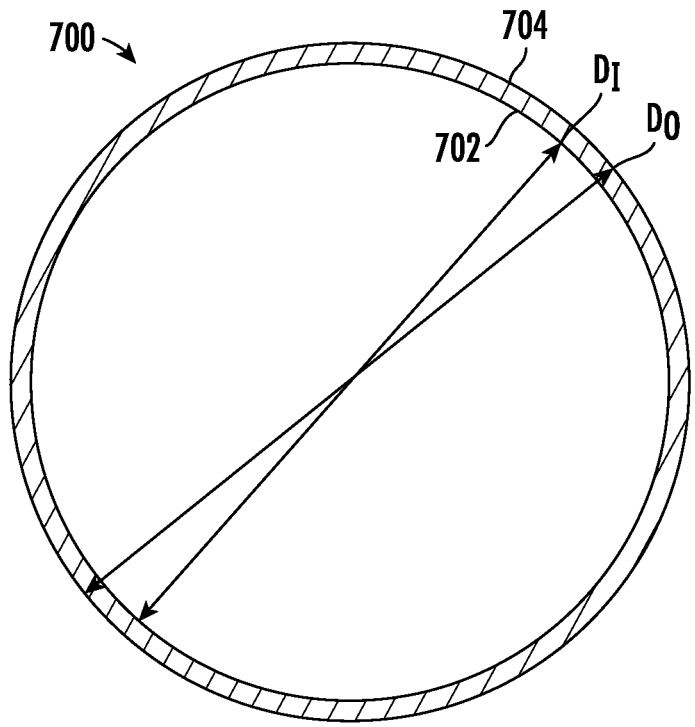
FIG. 7 is a side view of a precision circumferential tread according to another embodiment.

Referring now to FIG. 7, a precision circumferential tread 700 is shown. The precision circumferential tread 700 is similar to the precision circumferential tread 600. A difference between the precision circumferential tread 700 and the precision circumferential tread 600 is that the precision circumferential tread 700 does not include a splice (e.g., the splice 610).

For example, the precision circumferential tread 700 may be formed of a single, continuous piece of rubber that was formed in a mold (e.g., cylindrical mold, circular mold, etc.). Forming the precision circumferential tread 700 in the mold forms a precured tread assembly without the need for splicing (e.g., hot splicing, coupling together, etc.) the ends of a flat tread (e.g., strip tread, tread strip, PCT assembly 300, etc.). The precision circumferential tread 700 includes an inner surface 702 defined by the inner diameter $D_I$ and an outer surface 704 defined by the outer diameter Do. While the precision circumferential tread 600 and the precision circumferential tread 700 are similar to one another, there are some structural differences between the two. Because the precision circumferential tread 600 is formed by coupling the ends of the PCT assembly 300 together, the inner surface 602, prior to being bonded to the tire casing 102, may be under a slight compression and the outer surface 604 may be under a slight tension. As a person of ordinary skill in the art may appreciate, as the ratio of the tread thickness DT to the inner diameter $D_I$ (e.g., $D_T/D_I$) decreases, the compressive forces along the inner surface 602 will also decrease. The precision circumferential tread 700 may not exhibit the same inherent compressive and tensile forces as the precision circumferential tread 700 is formed using the circular mold. When the precision circumferential tread 600 is positioned around the tire casing 102, the entirety of the precision circumferential tread 600 may be under tension.

IV. A Method—PCT Assembly

Figure 8:
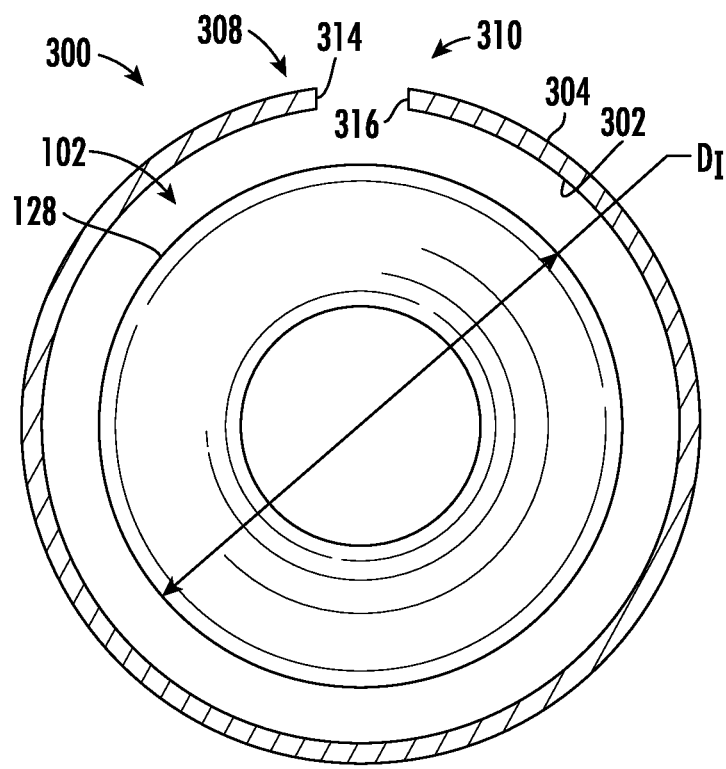
FIG. 8 is a side view of the portion of the tire of FIG. 2 in a retreading process using the precured tire tread of FIG. 3.

Referring now to FIG. 8, the tire casing 102 is shown in a retreading process that includes the PCT assembly 300. The tire casing 102 is shown as having the mounting surface 128, smoothed, buffed, and prepared to accept a tread assembly (e.g., the PCT assembly 300, the precision circumferential tread 600, the precision circumferential tread 700). As shown in FIG. 8, the mounting surface 128 has the inner diameter $D_I$. In some embodiments, the casing diameter $D_C$ is equal to the tread length DL.

After the tire casing 102 and the PCT assembly 300 have been buffed, the mounting surface 128, the mounting surface 302, the first PCT end surface 314, and the second PCT end surface 316 are subjected to a priming treatment. The term "priming treatment" as used herein means any treatment which optimizes the surface (e.g., the mounting surface 128, the mounting surface 302, the first PCT end surface 314, the second PCT end surface 316) of the substrate (e.g., tire casing 102, PCT assembly 300) for reception of the adhesive and subsequent curing of the adhesive to bond the tire casing 102 and the PCT assembly 300 together. Thus, it will be appreciated that various different types of priming treatments may be employed, and the method is not limited to any particular priming treatment. Examples of suitable priming treatments are discussed below.

In some embodiments, where the adhesive is hydrophilic, the primer behaves as a compatibilization agent to improve the adhesion between the mounting surface 128 and the mounting surface 302. The mounting surface 128 and the mounting surface 302 may both be inherently hydrophobic such that application of the adhesive alone to either of the surfaces causes the adhesive to 'bead up,' resulting in gaps of no adhesive existing between the PCT assembly 300 and the tire casing 102. The primer effectively transforms the otherwise hydrophobic surfaces into hydrophilic surfaces such that the adhesive is better able to spread across the mounting surface 128 and the mounting surface 302. Because the primer acts as a compatibilization agent, the adhesive is able to penetrate into each crevice, buff, cut, pit, and discontinuity within the buffed surface of both the mounting surface 128 and the mounting surface 302. When the adhesive cures, the adhesive may form a physical bond, a chemical bond, or a combination of physical and chemical bonds, between the PCT assembly 300 and the tire casing 102.

In some embodiments, the primer modifies (e.g., chemically modifies) the mounting surface 128 and the mounting surface 302 such that the adhesive is able to couple together (e.g., adhere to, cross-link with, etc.) the now-reactive polymer chains of the PCT assembly 300 and the tire casing 102.

According to one possible approach, the surfaces of the substrates may be treated with a halogen-containing priming agent.

The priming agent is applied to the tire casing 102 as a solution in a solvent, for example a volatile organic solvent. Caution should be exercised when combining primer and solvents; in certain combinations, explosive reactions are possible. Examples of typically suitable organic solvents are dichloromethane, ethyl acetate, and acetone. The concentration of the priming agent solution may be about 0.1-10% by weight, inclusive. In some embodiments, the concentration of the priming agent is 0.5-5% by weight, inclusive, based on the total weight of the solvent and the priming agent. The priming agent may be a 5 weight percent solution of 1,3-dichloro-5,5-dimethylhydantoin in dichloromethane. The priming agent rate of application may be 0.0000353-0.000705 ounces per square inch, inclusive (0.001-0.02 grams per square inch, inclusive). In some embodiments, the priming agent is applied at a rate of about 0.000106-0.000353 ounces per square inch, inclusive (e.g., 0.003-0.01 grams per square inch, inclusive).

The priming agent may be applied to the tire casing 102 and the PCT assembly 300 using any conventional mode of application, for example brushing or spraying. One coat of the priming agent is generally sufficient, but it is important to ensure that all of the mounting surface 128, the mounting surface 302, the first PCT end surface 314, and the second PCT end surface 316 have been wetted with the priming agent. The priming agent rate of application may be 0.0000176-0.00123 ounces per square inch, inclusive (0.005-0.035 grams per square inch, inclusive). In some embodiments, the priming agent is applied at a rate of about 0.000353-0.000529 ounces per square inch, inclusive (e.g., 0.010-0.015 grams per square inch, inclusive). The priming agent solution generally dries within a matter of minutes, to leave the primed surfaces ready for application of the adhesive composition.

The above-described priming treatment is not the only priming technique which can be employed. In some embodiments, the tire casing 102 and the PCT assembly 300 are primed by oxidation methods using oxidative reactants which may introduce functional groups upon application to the rubber surface, the type and number depending on reaction conditions and subsequently occurring chemical reactions. In a strict sense, the mechanism may not be an "oxidation", but the introduction of polar groups may be facilitated. In the case of some reactants (particularly the mineral acids), other functional groups may be introduced which will enhance the interaction with unreacted urethane (e.g., urethane precursors). Some of the groups introduced may be derived from epoxide, dioxetane (a 4-membered ring with 2 carbons and 2 oxygens), aldehyde, ketone, organic carboxylic acid, and alcohol. Reactants used may be strong mineral acids such as nitric or sulphuric acid; bases such as sodium hydroxide or potassium hydroxide; peroxides such as hydrogen peroxide or t-butyl hydroperoxide; inorganic oxidants such as potassium permanganate and potassium dichromate; organic acids, such as formic and trifluoroacetic; and peracids such as peroxyacetic and peroxybenzoic acid. Other reactants may be singlet oxygen sensitizers such as Rose Bengal and methylene blue; reactants such as aqueous ozone; reactants which cause addition of halogen such as HBr, HCl, $Cl_2$ and $Br_2$; reactants which cause addition to carbon-carbon unsaturation using R-substituted 1,2,4-triazoline 3,5 diones, where R is methyl, phenyl, butyl or naphthyl; or bis-(p-3,5-dioxo-1,2,4-triazoline-4-yl-phenyl) methane. Priming can also be effected using high energy radiation, including microwave discharge, corona discharge, and plasma treatment. The resulting surface modification may depend on the surface chemistry, the gases present, and the energy level employed.

Once the mounting surface 128, the mounting surface 302, the first PCT end surface 314, and the second PCT end surface 316 have been primed (e.g., prepared), an adhesive is applied to the mounting surface 128, the mounting surface 302, the first PCT end surface 314, and the second PCT end surface 316. In some embodiments, the mounting surface 128 has a width greater than the width of the mounting surface 302. Thus, it may be desirable, in some embodiments, to apply the adhesive to the mounting surface 128 only where the mounting surface 302 will contact. In other words, the adhesive may be applied to the mounting surface 128 between the edges of the bondline 130. In some embodiments, between the edges of the bondline 130 is the entire mounting surface 128. In some embodiments, between the edges of the mounting surface 128 is a portion of the mounting surface 128, referred to as a contact area (e.g., bondline).

In some embodiments, the adhesive may be a low-temperature curing adhesive (e.g., an adhesive structured to cure at a temperature near room temperature). In some embodiments, the adhesive is structured to cure between 40-130° F., inclusive. In some embodiments, the adhesive is structured to cure between 65-85° F., inclusive. In some embodiments, the adhesive is configured to cure between 70-80° F., inclusive. In some embodiments, the adhesive is configured to cure at approximately 75° F. (e.g., 73-77° F., inclusive). In some embodiments, the adhesive is configured to cure when exposed to moisture (e.g., water, mist, etc.).

The adhesive may be a polyurethane adhesive. Polyurethane adhesive compositions may be one-part systems, and comprise an isocyanate-terminated prepolymer and a polyhydroxide curing agent. The isocyanate-terminated prepolymer is generally in liquid form and is formed by reacting a polyether polyol or polyester polyol with a molar excess of an isocyanate (e.g., polyisocyanate, di-isocyanate, etc.). The prepolymer may be formed by reacting the polyisocyanate with a polyester polyol. In order to reduce reactivity of the polyhydroxide curing agent and to prevent substantial gelling or hardening of the adhesive composition during storage, the polyhydroxide compound may be present as an insoluble phase in the isocyanate-terminated liquid prepolymer phase.

The adhesive is applied to the primer disposed on the mounting surface 302. In other words, the adhesive is applied to the now-primed mounting surface 302 in small patches. The adhesive is then spread evenly on the mounting surface 302 using a trowel to a thickness of about 15 thousandths of an inch. Any excess adhesive is removed.

The adhesive is also applied to the primer disposed on the mounting surface 128. In other words, the adhesive is spread evenly on the now-primed mounting surface 128, in some embodiments to a thickness of about 15 thousandths of an inch. This is accomplished by applying the adhesive in small amounts via the trowel while the tire casing 102 is slowly rotated. As the tire casing 102 is rotated, moderate pressure on the mounting surface 128 by the trowel will remove undesired adhesive by doctoring action.

In some embodiments, after applying the adhesive and before applying the PCT assembly 300 to the tire casing 102, a user may mist the adhesive with water. In some embodiments, misting the adhesive on the mounting surface 128 only, misting the adhesive on the mounting surface 302 only, or misting both the adhesive on the mounting surface 128 and the mounting surface 302.

In some embodiments, the adhesive is a two-part adhesive, such as an epoxy, having a first part and a second part. The first part may be applied to the mounting surface 128 and the second part may be applied to the mounting surface 302 such that the first part and the second part mix when the PCT assembly 300 is applied to the tire casing 102.

After the adhesive has been applied to the mounting surface 128 and the mounting surface 302, the PCT assembly 300 may be placed on the tire casing 102 and the two adhesive-coated surfaces mated. Specifically, the mounting surface 302 and the mounting surface 128 may be mated. After the PCT assembly 300 is applied to the tire casing 102, the first PCT end 308 and the second PCT end 310 may be mated together. For example, the first PCT end 308 and the second PCT end 310 may be stapled together with setting staples every ½ inch such that the first PCT end surface 314 interfaces with the second PCT end surface 316. In some embodiments, the adhesive is applied to the first PCT end surface 314 and the second PCT end surface 316 prior to the PCT assembly 300 being placed on the tire casing 102. In some embodiments, the adhesive is applied to the first PCT end surface 314 and the second PCT end surface 316 after the PCT assembly 300 is placed on the tire casing 102 and before the first PCT end 308 and the second PCT end 310 are stapled together. In some embodiments, the adhesive is interposed (e.g., squeezed in, etc.) between the first PCT end surface 314 and the second PCT end surface 316 after the first PCT end 308 and the second PCT end 310 are stapled together.

After the PCT assembly 300 is disposed on the tire casing 102, a roller pressing process, commonly referred to as stitching, may be performed on the retreaded tire assembly to produce a bondline of more uniform thickness. In some embodiments, stitching is used to force air out and away from the bondline (e.g., from between the tire casing 102 and the PCT assembly 300). Specifically, to force air out and away from between the mounting surface 128 and the mounting surface 302.

After stitching, a film 900 may be coupled to the opposing surface 304 about the circumference of the opposing surface 304. In some embodiments, the film 900 is a perforated polymer film, for example polyethylene film, in some embodiments triple folded (three thicknesses, 3 inches wide), and centered onto the opposing surface 304 and stapled to the PCT assembly 300 after the stitching process. The retreaded tire assembly is then rotated on a tire building device (e.g., a tire building system, a rim assembly, a tire assembly machine, etc.) and the polymer film wrapped around the opposing surface 304 as the retreaded tire assembly rotates. The free end of the film is then stapled onto the opposing surface 304, through the area containing the setting staples. Specifically, the free end of the film is stapled to the PCT assembly 300 proximate the first PCT end 308 and the second PCT end 310.

The film 900 may be coupled to the PCT assembly 300 using glue, fasteners, staples, or similar fasteners. The film 900 may have a film width greater than the tread width $D_W$ such that the film 900 extends over the shoulder areas 124 and covers the edges of the bondline 130 (e.g., covers the first PCT side 318 and the second PCT side 320). During the retreading and stitching processes, some of the adhesive may be disposed near or proximate the edges of the bondline 130. The film 900 is configured to protect the edges of the bondline 130 from coming into contact with foreign bodies (e.g., dust, towels, clothing, curing envelope, etc.) and getting stuck to or cured to the tire 100. The film 900 may be profiled with perforations such that air can escape from within the grooves 306 when the tire 100 is placed in an envelope for curing. In some embodiments, the film 900 also helps to maintain the positioning of the PCT assembly 300 on the tire casing 102, the film 900 applying a force radially inward on the PCT assembly 300.

V. A Method—Precision Circumferential Tread

Figure 9:
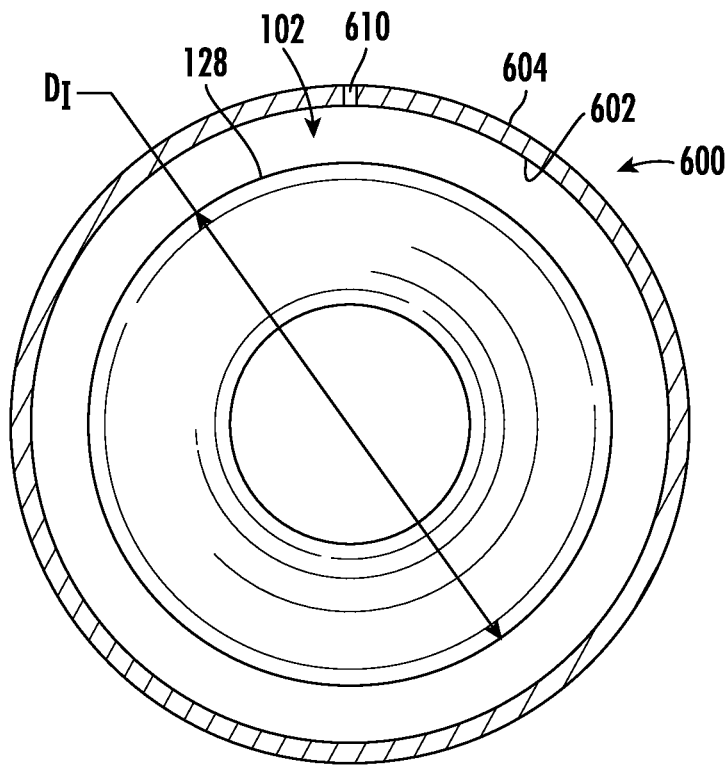
FIG. 9 is a side view of the portion of the tire of FIG. 2 in a retreading process using the precision circumferential tread of FIG. 6.

Referring now to FIG. 9, the tire casing 102 is shown in a retreading process that includes the precision circumferential tread 600. However, it should be noted that, in some embodiments, the precision circumferential tread 600 may be interchanged with the precision circumferential tread 700. The tire casing 102 is shown as having the mounting surface 128, smoothed, buffed, and prepared to accept a tread assembly (e.g., the PCT assembly 300, the precision circumferential tread 600, the precision circumferential tread 700). As shown in FIG. 9, the mounting surface 128 has the inner diameter $D_I$. The precision circumferential tread 600 is shown in its stretched inner diameter configuration where the inner surface 602 defines a diameter greater than the inner diameter $D_I$.

After the tire casing 102 and the precision circumferential tread 600 have been buffed, the mounting surface 128 and the inner surface 602 are subjected to a priming treatment. The term "priming treatment" as used herein means any treatment which optimizes the surface (e.g., the mounting surface 128, the inner surface 602) of the substrate (e.g., tire casing 102, precision circumferential tread 600, precision circumferential tread 700) for reception of the adhesive and subsequent curing of the adhesive to bond the tire casing 102 and the precision circumferential tread 600 together. Thus, it will be appreciated that various different types of priming treatments may be employed, and the method is not limited to any particular priming treatment. Examples of suitable priming treatments are discussed below.

In some embodiments, where the adhesive is hydrophilic, the primer behaves as a compatibilization agent to improve the adhesion between the mounting surface 128 and the inner surface 602. The mounting surface 128 and the inner surface 602 may both be inherently hydrophobic such that application of the adhesive alone to either of the surfaces causes the adhesive to 'bead up,' resulting in gaps of no adhesive existing between the precision circumferential tread 600 and the tire casing 102. The primer effectively transforms the otherwise hydrophobic surfaces into hydrophilic surfaces such that the adhesive is better able to spread across the mounting surface 128 and the inner surface 602. Because the primer acts as a compatibilization agent, the adhesive is able to penetrate into each crevice, buff, cut, pit, and discontinuity within the buffed surface of both the mounting surface 128 and the inner surface 602. When the adhesive cures, the adhesive may form a physical bond, a chemical bond, or a combination of physical and chemical bonds between the precision circumferential tread 600 and the tire casing 102.

In some embodiments, the primer modifies (e.g., chemically modifies) the mounting surface 128 and the inner surface 602 such that the adhesive is able to couple together (e.g., adhere to, cross-link, etc.) the now reactive polymer chains of the precision circumferential tread 600 and the tire casing 102.

According to one possible approach, the surfaces of the substrates may be treated with a halogen-containing priming agent.

The priming agent is applied to the tire casing 102 and the precision circumferential tread 600 as a solution in a solvent, for example a volatile organic solvent. Caution should be exercised when combining primer and solvents; in certain combinations, explosive reactions are possible. Examples of suitable organic solvents may be dichloromethane, ethyl acetate and acetone. The concentration of the priming agent solution may be 0.1-10% by weight. In some embodiments, the concentration of the priming agent solution is 0.5-5% by weight, inclusive, based on the total weight of the solvent and the priming agent. The priming agent may be a 5 weight percent solution of 1,3-dichloro-5,5-dimethylhydantoin in dichloromethane. The priming agent rate of application may be 0.0000353-0.000705 ounces per square inch, inclusive (0.001-0.02 grams per square inch, inclusive). In some embodiments, the priming agent is applied at a rate of about 0.000106-0.000353 ounces per square inch, inclusive (e.g., 0.003-0.01 grams per square inch, inclusive).

The priming agent may be applied to the tire casing 102 and the precision circumferential tread 600 using any conventional mode of application, for example brushing or spraying. One coat of the priming agent is generally sufficient, but it is important to ensure that all of the mounting surface 128 and the inner surface 602 have been wetted with the priming agent. The priming agent rate of application may be 0.0000176-0.00123 ounces per square inch, inclusive (0.005-0.035 grams per square inch, inclusive). In some embodiments, the priming agent is applied at a rate of about 0.000353-0.000529 ounces per square inch, inclusive (e.g., 0.010-0.015 grams per square inch, inclusive). The priming agent solution generally dries within a matter of minutes, to leave the primed surfaces ready for application of the adhesive composition.

The above-described priming treatment is not the only priming technique which can be employed. In some embodiments, the tire casing 102 and the precision circumferential tread 600 are primed by oxidation methods using oxidative reactants which may introduce functional groups upon application to the rubber surface, the type and number depending on reaction conditions and subsequently occurring chemical reactions. In a strict sense, the mechanism may not be an "oxidation", but the introduction of polar groups may be facilitated. In the case of some reactants (particularly the mineral acids), other functional groups may be introduced which will enhance the interaction with unreacted urethane (e.g., urethane precursors). Some of the groups introduced may be derived from epoxide, dioxetane (a 4-membered ring with 2 carbons and 2 oxygens), aldehyde, ketone, organic carboxylic acid, and alcohol. Reactants used may be strong mineral acids such as nitric or sulphuric acid; bases such as sodium hydroxide or potassium hydroxide; peroxides such as hydrogen peroxide or t-butyl hydroperoxide; inorganic oxidants such as potassium permanganate and potassium dichromate; organic acids, such as formic and trifluoroacetic; and peracids such as peroxyacetic and peroxybenzoic acid. Other reactants may be singlet oxygen sensitizers such as Rose Bengal and methylene blue; reactants such as aqueous ozone; reactants which cause addition of halogen such as HBr, HCl, $Cl_2$ and $Br_2$; reactants which cause addition to carbon-carbon unsaturation using R-substituted 1,2,4-triazoline 3,5 diones, where R is methyl, phenyl, butyl or naphthyl; or bis-(p-3,5-dioxo-1,2,4-triazoline-4-yl-phenyl) methane. Priming can also be effected using high energy radiation, including microwave discharge, corona discharge, and plasma treatment. The resulting surface modification may depend on the surface chemistry, the gases present, and the energy level employed.

Once both the mounting surface 128 and the inner surface 602 have been primed (e.g., prepared), an adhesive is applied to both the mounting surface 128 and the inner surface 602.

In some embodiments, the adhesive may be a low-temperature curing adhesive (e.g., an adhesive structured to cure at a temperature near room temperature). In some embodiments, the adhesive is structured to cure between 50-100° F., inclusive. In some embodiments, the adhesive is structured to cure between 65-85° F., inclusive. In some embodiments, the adhesive is configured to cure between 70-80° F., inclusive. In some embodiments, the adhesive is configured to cure at approximately 75° F. (e.g., 73-77° F., inclusive). In some embodiments, the adhesive is configured to cure when exposed to moisture.

The adhesive may be a polyurethane adhesive. Polyurethane adhesive compositions may be one-part systems, and comprise an isocyanate-terminated prepolymer and a polyhydroxide curing agent. The isocyanate-terminated prepolymer is generally in liquid form and is formed by reacting a polyether polyol or polyester polyol with a molar excess of an isocyanate (e.g., polyisocyanate, di-isocyanate, etc.). The prepolymer may be formed by reacting the polyisocyanate with a polyester polyol. In order to reduce reactivity of the polyhydroxide curing agent and to prevent substantial gelling or hardening of the adhesive composition during storage, the polyhydroxide compound may be present as an insoluble phase in the isocyanate-terminated liquid prepolymer phase.

The adhesive is applied to the primer disposed on the inner surface 602. In other words, the adhesive is applied to the now-primed inner surface 602 in small patches. The adhesive is then spread evenly on the inner surface 602 using a trowel to a thickness of about 15 thousandths of an inch. Any excess adhesive is removed.

The adhesive is also spread evenly on the primer disposed on the mounting surface 128. In other words, the adhesive is applied to the now-primed mounting surface 128, in some embodiments to a thickness of about 15 thousandths of an inch. This is accomplished by applying the adhesive in small amounts via the trowel while the tire casing 102 is slowly rotated. As the tire casing 102 is rotated, moderate pressure on the mounting surface 128 by the trowel will remove undesired adhesive by doctoring action.

After the adhesive has been applied to the mounting surface 128, the precision circumferential tread 600 may be stretched over the tire casing 102 and the inner surface 602 may be placed in contact with the mounting surface 128 such that the adhesive is interposed between the tire casing 102 and the precision circumferential tread 600. After the precision circumferential tread 600 is disposed on the tire casing 102, a roller pressing process, commonly referred to as stitching, may be performed on the precision circumferential tread 600 to produce a bondline of more uniform thickness. In some embodiments, stitching is used to force air out and away from the bondline (e.g., from between the tire casing 102 and the precision circumferential tread 600).

After stitching the precision circumferential tread 600 to the tire casing 102, the film 900 may be coupled to the outer surface 604 about a circumference of the outer surface 604. In some embodiments, the film 900 is a perforated polymer film, for example polyethylene film, in some embodiments triple folded (three thicknesses, 3 inches wide), and centered onto the outer surface 604 and stapled to the precision circumferential tread 600 after the stitching process. The retreaded tire assembly is then rotated on the tire building device and the film 900 wrapped around the outer surface 604 as the retreaded tire assembly rotates. The free end of the film is then stapled onto the outer surface 604.

The film 900 may be coupled to the precision circumferential tread 600 using glue, fasteners, staples, or similar fasteners. The film 900 may have a film width greater than the tread width $D_W$ such that the film 900 extends over the shoulder areas 124 and covers the edges of the bondline 130 (e.g., covers the first PCT side 318 and the second PCT side 320). In some embodiments, the film 900 covers the entirety of the edges of the bondline 130. During the retreading and stitching processes, some of the adhesive may be disposed near or proximate the edges of the bondline 130. The film 900 is configured to protect the edges of the bondline 130 from coming into contact with foreign bodies and getting stuck to or cured to the tire 100. The film 900 may be profiled with perforations such that air can escape from within the grooves 306 when the tire 100 is placed in an envelope for curing.

VI. A Method—Curing the Adhesive

Figure 10:
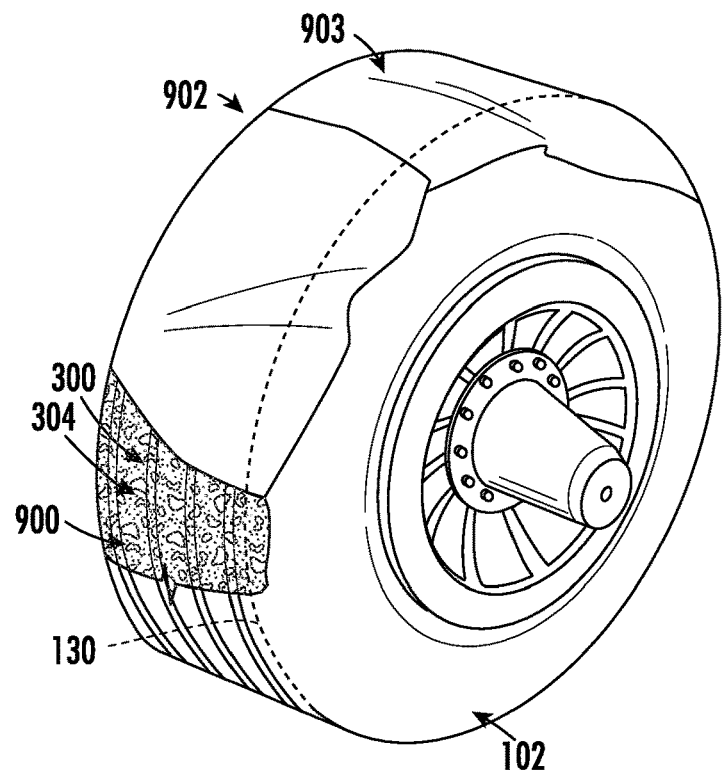
FIG. 10 is a perspective view of a retreaded tire assembly with a moisture reservoir.

Referring now to FIG. 10, the retreaded tire assembly is shown. The retreaded tire assembly may include the tire casing 102 and any one of the PCT assembly 300, the precision circumferential tread 600, or the precision circumferential tread 700. A method of curing the adhesive is substantially the same for the PCT assembly 300, the precision circumferential tread 600, and the precision circumferential tread 700. Herein, the method will be described with respect to the PCT assembly 300.

As shown in FIG. 10, a moisture reservoir may be positioned on the retreaded tire assembly. The moisture reservoir may be positioned on the retreaded tire assembly such that the moisture reservoir is positioned proximate to the edges of the bondline 130. The moisture reservoir is configured to present moisture proximate to the edges of the bondline 130 such that moisture may permeate the bondline and facilitate curing of the adhesive. Positioning a moisture reservoir proximate to the edges of the bondline 130 may decrease the amount of time required to cure the adhesive (e.g., facilitate faster curing of the adhesive). The adhesive may be a moisture-curable adhesive, requiring the presence of moisture to cure. In some embodiments, the adhesive may be configured to cure without a moisture reservoir, but the curing time and the bond strength may be improved by the presence of a moisture reservoir during a transition of the adhesive from uncured to cured.

The film 900 may be interposed between the moisture reservoir and the PCT assembly 300. In some embodiments, the moisture reservoir is coupled directly to the PCT assembly 300. The moisture reservoir may be positioned such that the moisture reservoir covers the entirety of the edges of the bondline 130.

Moisture may include water, distilled water, adhesive reactants, isocyanate reactants, or similar liquids and moistures.

The moisture reservoir is configured to introduce moisture to the adhesive interposed between the tire casing 102 and the PCT assembly 300 via the edges of the bondline 130. In some embodiments, the moisture reservoir is configured to produce steam, such as through increasing the temperature of (e.g., boiling) water. In some embodiments, the moisture reservoir releases water vapor (e.g., evaporated water) proximate to the edges of the bondline 130. The release of either steam or water vapor may be controlled such that the predetermined amount of moisture is presented to the edges of the bondline 130 (e.g., not too much and not too little). In some embodiments, the moisture reservoir passively holds moisture such that the moisture may evaporate from the moisture reservoir and permeate the edges of the bondline 130 to facilitate curing of the adhesive proximate to the bondline.

The moisture reservoir may be an absorbent textile, such as a textile 902. The textile 902 may be formed of a flexible material, such as cotton, nylon, polyester, synthetic fibers, and similar materials known to be absorbent. In some embodiments, the moisture reservoir is formed of felt or foam. In some embodiments, the textile 902 may be formed of an elastic material, structured to expand and increase a surface area upon the application of force. For example, the textile 902 may be formed of Spandex or Lycra. In some embodiments the textile 902 may be formed of a combination of flexible materials and elastic materials such that the textile 902 exhibits a desirable amount of absorption, flexibility, and stretchability. In some embodiments, the textile 902 is a towel, such as a cotton towel, a microfiber towel, or a similar towel. The textile 902 may be absorbent such that the textile 902 can absorb and retain the predetermined amount of moisture.

The textile 902 may define a generally rectangular shape having the same size as the film 900. In some embodiments, the textile 902 may be a thin strip (e.g., 1 inch wide) that covers one of the edges of the bondline 130. In some embodiments, two thin strips of the textile 902 may be positioned proximate to and covering both of the edges of the bondline 130. The textile 902 may come on a spool that is applied to the PCT assembly 300 after the film 900 is applied to the PCT assembly 300. The textile 902 may be disposable after the curing process is complete. In some embodiments, the textile 902 is able to be reused for more than one curing process of the adhesive.

The textile 902 may be coupled to the PCT assembly 300 proximate to the opposing surface 304 such that the textile 902 interfaces with the film 900. In some embodiments, the film 900 is entirely interposed between the textile 902 and the opposing surface 304, preventing contact between the textile and the opposing surface 304. In some embodiments, the textile 902 and the film 900 are integrally formed into a single body to facilitate easier application of the textile 902. For example, the textile 902 may be STRIP WICK™. In some embodiments, the textile 902 is a disposable cloth (e.g., paper cloth, paper towels, Handi-Wipes, etc.). In some embodiments, the sides of the film 900 may extend toward the side walls 106 of the tire casing 102, the film 900 covering (e.g., positioned above, contacting, etc.) the first PCT side 318, the second PCT side 320, and the edges of the bondline 130. The film 900 may be interposed between the textile 902 and the PCT assembly 300 such that the textile 902 does not interface with the opposing surface 304, the first PCT side 318, the second PCT side 320, and the edges of the bondline 130.

The textile 902 may be coupled to the PCT assembly 300 using staples, tacks, pins, nails, or similar fasteners. In some embodiments, the textile 902 may be sized such that the textile 902 may cover the entire opposing surface 304. In some embodiments, the textile 902 may cover the entire PCT assembly 300 (e.g., extend toward the rotational axis of the tire casing 102 and cover a portion of the tire casing 102 such that the PCT assembly 300 and the edges of the bondline 130 are hidden from view). The textile 902 may be approximately the same size (e.g., have the same length and width) as the film 900. In some embodiments, the textile 902 may not, alone, cover the entirely of the opposing surface 304, but multiple textiles may be required, shown as a second textile 903, a third textile 904, and a fourth textile 905 to cover the entirely of the opposing surface 304.

Figure 11:
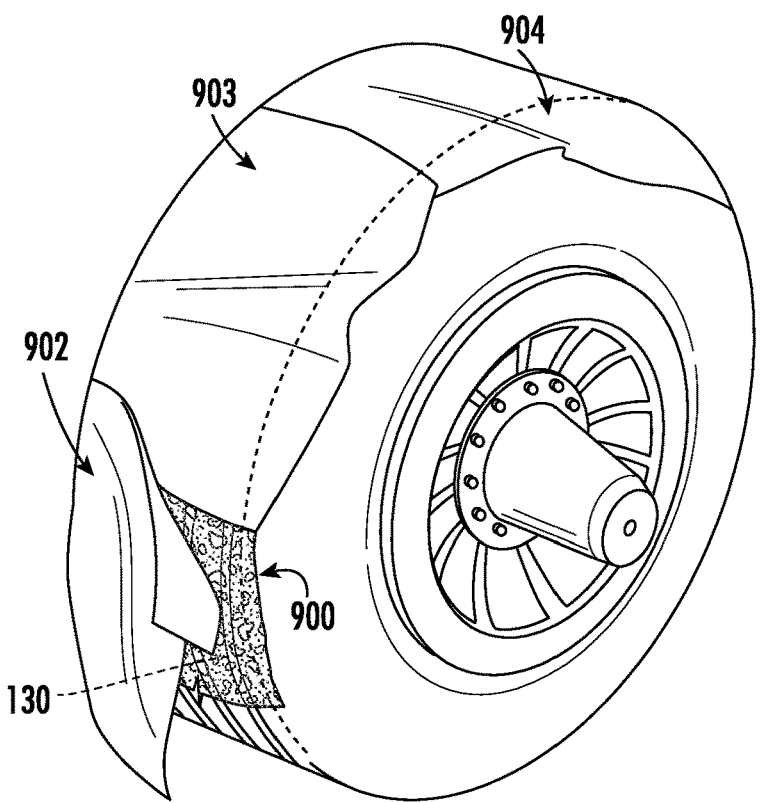
FIG. 11 is a perspective view of the retreaded tire assembly with the moisture reservoir of FIG. 10.

Referring to FIG. 11, the textile 902 may be fastened to the opposing surface 304 in an overlapping pattern such that a portion of the textile 902 overlaps with a portion of the second textile 903, and a portion of the second textile 903 overlaps with a portion of the third textile 904.

After the textile 902 is fastened to the opposing surface 304, the textile 902 may be wetted (e.g., moistened, soaked, drenched, sprayed, submerged, etc.) with moisture. For example, as the tire casing 102 is rotated, a sprayer may mist the textile 902 with the predetermined amount of moisture such that the textile 902 absorbs the predetermined amount of moisture. In some embodiments, the textile 902 may be wetted prior to being coupled to the PCT assembly 300. For example, the textile 902 may be stored in a humidor such that the textile 902 is kept at an optimal temperature and optimally saturated (e.g., saturated with the predetermined amount of moisture).

Figure 12:
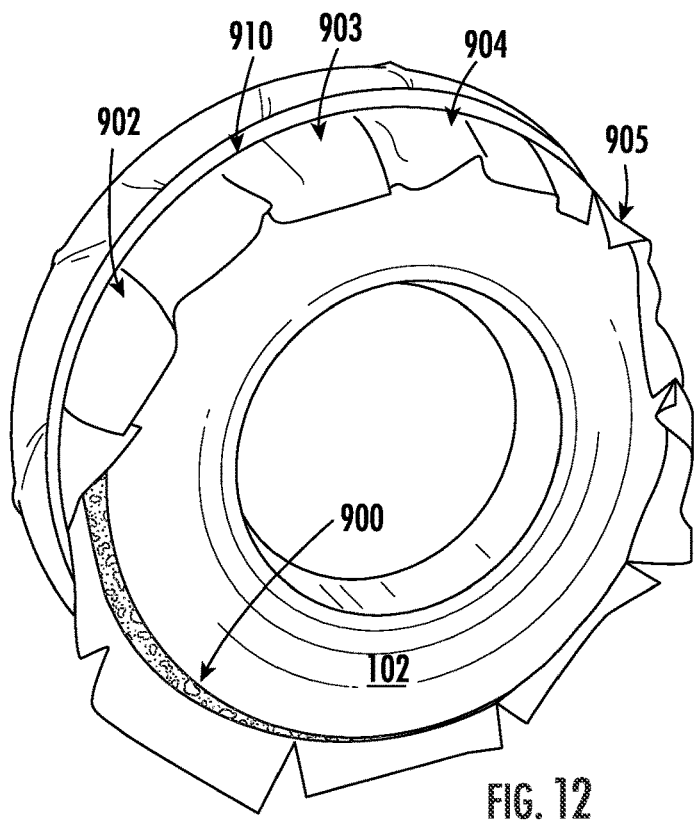
FIG. 12 is a perspective view of the retreaded tire assembly with the moisture reservoir of FIG. 10.

Referring to FIG. 12, the PCT assembly 300 is shown as being covered by the textiles (e.g., the textile 902, the second textile 903, the third textile 904, and the fourth textile 905). To retain the textiles to the retreaded tire assembly (e.g., the PCT assembly 300, the opposing surface 304), a belt 910 may be positioned circumferentially around the opposing surface 304 and the textiles, the belt 910 configured to apply a circumferentially inward force on the textiles in a direction generally toward the tire casing 102. In some embodiments, the textile 902 is not fastened to the PCT assembly 300 using fasteners, but is instead only secured to the PCT assembly 300 using the belt 910.

Figure 13:
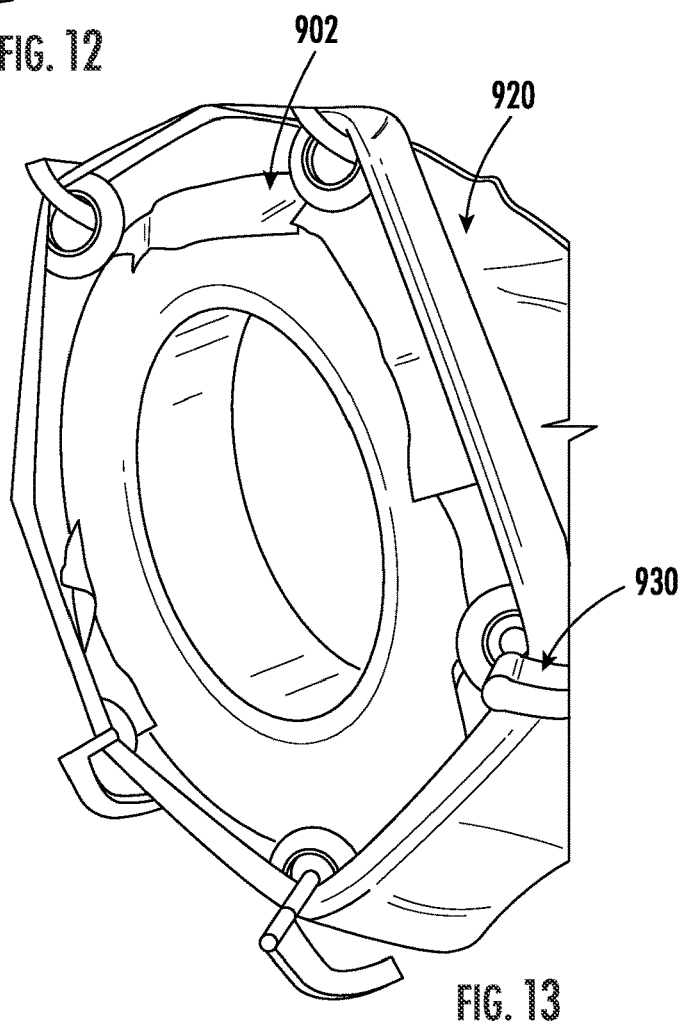
FIG. 13 is a perspective view of the retreaded tire assembly with the moisture reservoir of FIG. 10 placed in an envelope.

Referring to FIG. 13, the retreaded tire assembly and the textiles are inserted into an envelope 920 using an envelope spreader 930 (e.g., spreader, envelope stretcher, etc.). In some embodiments, the textiles are positioned on the opposing surface 304 such that no portion of the envelope 920 comes into contact with the opposing surface 304 during the curing process. In some embodiments, the textiles are (e.g., the textile 902 is) positioned on the PCT assembly 300 such that no portion of the envelope 920 interfaces with the PCT assembly 300 or the film 900 during the curing process.

Speaking generally, the textile 902 is positioned within the envelope 920 along with the retreaded tire assembly such that the predetermined amount of moisture may be present within the envelope 920 proximate to the edges of the bondline 130 to facilitate curing of the adhesive. In some embodiments, the predetermined amount of moisture required to cure the adhesive is able to be absorbed into a single textile, such as the textile 902. In such an embodiment, the textile 902 may be fastened to the opposing surface 304 and not cover and entirety of the opposing surface 304, allowing the envelope 920 to come into contact with the film 900 during curing. In some embodiments, one-half of the opposing surface 304 (e.g., not necessarily a contiguous half, net half, etc.) may be covered by textiles configured to absorb and maintain the predetermined amount of moisture required to cure the adhesive.

Figure 14:
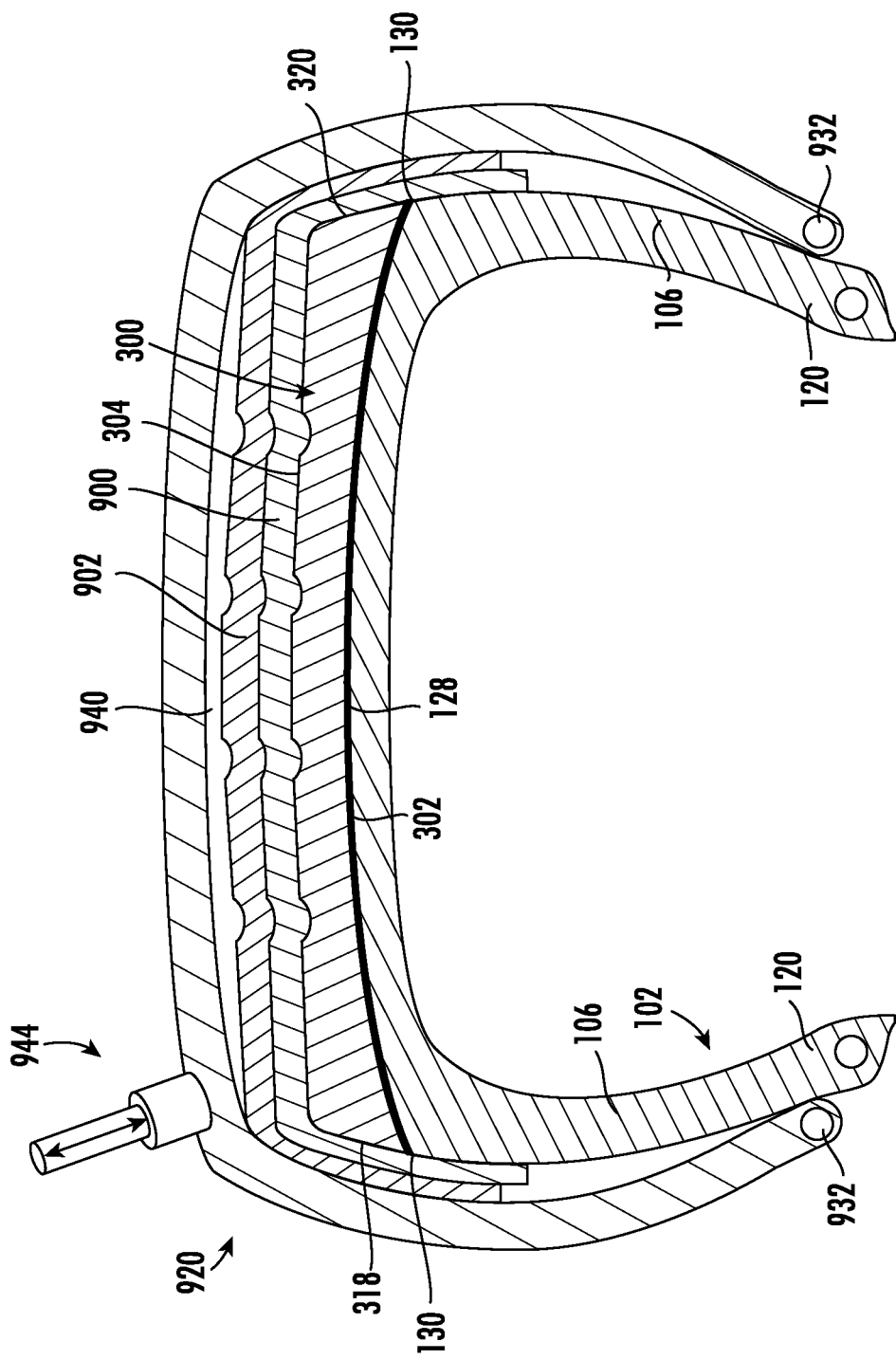
FIG. 14 is a cross-section view of the retread tire assembly with the moisture reservoir placed in the envelope of FIG. 13.

Turning now to FIG. 14, the textile 902, the precision circumferential tread 600, and the tire casing 102 are shown positioned within the envelope 920. The envelope 920 may include an envelope rim 932 (e.g., the BANDAG™ ARC RING SYSTEM™, etc.) inserted into the bead area 120 and expanded, forming an air tight seal between the retreaded tire assembly and the envelope 920. Thus, air and moisture may only circulate within a volume 940 defined between the envelope 920 and the retreaded tire assembly.

The envelope 920 further includes a conduit 944 fluidly coupled to the volume 940. Air is removed from the volume 940 through the conduit 944 by way of a pump or other suitable vacuum system. The air is removed such that the envelope 920 and the retreaded tire assembly move toward one another. At some points, such as proximate to the side walls 106, the envelope 920 may contact the tire casing 102. As a result of the vacuum (e.g., low vacuum, medium vacuum, high vacuum, etc.) within the envelope 920, a pressure is applied to the PCT assembly 300 in a direction generally toward the mounting surface 128 of the tire casing 102. The vacuum alone may apply approximately 14.7 pound per square inch (PSI) of pressure to the opposing surface 304. The pressure facilitates proper binding between the mounting surface 302 and the mounting surface 128 as the adhesive cures.

In some embodiments, the retreaded tire assembly and the envelope 920 may be placed into a pressure chamber where pressures above atmospheric pressures may be achieved. Once the envelope 920 and the retreaded tire assembly are placed in the pressure chamber, the conduit 944 may extend out of the pressure chamber to allow air to escape from the envelope 920 via the conduit 944. The pressure chamber door is shut and the chamber pressurized. In some embodiments, it may be desirable to seal the edges of the bondline 130 such that air may not enter the bondline 130. When the pressure in the chamber reaches 70 PSI, the pressure in the envelope 920 may be increased. When the chamber reaches 85 PSI, air may be injected into the envelope 920 to a pressure of 70 PSI. In this way, the pressure in the chamber is higher than the pressure in the envelope 920, and reduces any tendency for the grooves 306 or spaces in the PCT assembly 300 to be closed due to lateral pressure imparted on the opposing surface 302 by the envelope 920. In some embodiments, the adhesive is cured at 75° F. for 7 days (e.g., one week). In some embodiments, the adhesive is cured at 42 PSI for 3 days.

The pressure applied to the PCT assembly 300 within the pressure chamber may be between 65-105 PSI, inclusive. In some embodiments, the pressure applied to the PCT assembly 300 is between 75-95 PSI, inclusive. In some embodiments, the pressure applied is approximately 85 PSI (between 82-88 PSI, inclusive). In some embodiments, the pressure applied to the PCT assembly 300 may be lower. The pressure applied to the PCT assembly 300 may be between 20-60 PSI, inclusive. In some embodiments, the pressure applied to the PCT assembly 300 is between 35-50 PSI, inclusive. In some embodiments, the pressure applied is approximately 42 PSI (between 39-45 PSI, inclusive). While the PCT assembly 300 is under pressure, the predetermined amount of moisture absorbed within the textile 902 may circulate within the volume 940 and interact with the adhesive proximate to the edges of the bondline 130, facilitating the curing of the adhesive.

In some embodiments, such as those where a curing chamber is not readily accessible, air is removed from the volume 940 via the conduit 944 to form a vacuum (e.g., a substantial vacuum) within the envelope 920. As air is removed from the envelope 920, the envelope 920 exerts pressure generally toward the tire casing 102. The envelope 920 may begin to conform to the shape of the tire casing 102, the PCT assembly 300, and the textile 902. As shown in FIG. 14, the envelope 920 may bias the film 900 and the textile 902 toward the edges of the bondline 130, the film 900 interposed between the textile 902 and the edges of the bondline 130 such that the textile 902 does not interface with the edges of the bondline 130. The perforations in the film 900 may facilitate the transfer of moisture from the textile 902 to the bondline via the edges of the bondline 130, the perforations allowing the moisture to pass through the film 900. The vacuum may cause the moisture absorbed within the textile 902 to vaporize, increasing the amount of moisture available proximate to the edges of the bondline 130. In some embodiments, removing the air within the volume 940 through the conduit 944 may also remove some moisture from the textile 902, and thus it may be desirable, in some embodiments, to moisten the textile 902 with more moisture (e.g., slightly more moisture) than what is required of the adhesive to cure, to ensure that enough moisture interacts with (e.g., reacts with) the adhesive.

In some embodiments, where portions of the film 900 contact portions of the envelope 920 proximate to the opposing surface 304, the envelope 920 may extend into the grooves 306 of the tread pattern 312, reaching (e.g., nearly reaching) the bottom of the grooves 306. This may be desirable in some embodiments, as the elasticity of the envelope 920 helps to ensure that the PCT assembly 300, even the portions of the PCT assembly 300 positioned at the bottom of the grooves 306, are pressed toward the mounting surface 128 and properly cured. In some embodiments, such as when a curing chamber is used to cure the PCT assembly 300, air pressure is re-applied within the envelope to apply pressure to the bottom of the grooves 306. In some embodiments, the film 900 is interposed between the PCT assembly 300 (e.g., the opposing surface 304) and the envelope 920 such that as the envelope 920 extends into the grooves 306 and the film 900 is biased into the grooves 306, where the perforations of the film 900 prevent air from becoming trapped within the grooves 306.

In some embodiments, where the textile 902 is positioned between the envelope 920 and the film 900 proximate to the opposing surface 304, the envelope 920 may push portions of the textile 902 into the grooves 306. In some embodiments, the textile 902 is made of a strong, flexible, and resilient material able to be flush against each surface of the tread pattern 312 and the grooves 306 when the volume 940 is under a vacuum. In some embodiments, the textile 902 may include perforations (e.g., holes, mesh, etc.) that allow air to pass through the textile 902, preventing air from being trapped within the grooves 306 by the textile 902. The perforations may improve the conformity of the textile 902 to the tread pattern 312 and grooves 306 when the volume 940 is under vacuum.

In some embodiments, the textile 902 may be positioned in confronting relation to the edges of the bondline 130, the film 900 disposed between the textile 902 and the edges of the bondline 130 such that the textile 902 does not cure to the tire 100. This may be desirable, in some embodiments, where air circulation, and thus moisture circulation, within the volume 940 is minimal or zero. In some embodiments, the film 900 may extend over the first PCT side 318 and the second PCT side 320, but not the edges of the bondline 130, allowing the textile 902 to come into contact with the edges of the bondline 130 when the envelope 920 is under the vacuum.

In some examples, the PCT assembly 300 was positioned about the mounting surface 128, the adhesive interposed between, and the retreaded tire assembly placed within the envelope without a moisture reservoir (e.g., the textile 902) positioned proximate to the edges of the bondline 130 within the envelope. After the designated curing time had elapsed, the retreaded tire assembly was removed from the envelope 920 and it was determined that the adhesive had not adequately cured, causing the tire 100 to fail testing.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the invention unless otherwise claimed. No language in the specification should be construed as indicating any non-claimed element as essential to the practice of the invention It should be noted that the term "example" as used herein to describe some embodiments is intended to indicate that some embodiments are possible examples, representations, and/or illustrations of possible embodiments (and such term is not intended to connote that some embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Some embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, embodiments include all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

It is important to note that the construction and arrangement of the various embodiments are illustrative only. Although some embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein.

While this specification contains many specific implementation details, these should not be construed as limitations on the scope of this disclosure or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of retreading a tire without the use of a curing chamber for vulcanizing rubber, the method comprising:
   determining a predetermined amount of moisture associated with controlling a release of water vapor during curing of a moisture-curing adhesive;
   interposing a moisture-curing adhesive between an inner surface of a circumferential tread and an outer surface of a tire casing;
   applying the circumferential tread to the tire casing so the inner surface contacts the outer surface and a bondline edge forms circumferentially about the tire casing proximate to a shoulder of the tire casing;
   coupling a moisture reservoir to the circumferential tread proximate to the bondline edge such that at least a portion of the circumferential tread is not covered by the moisture reservoir;

interposing a film between the bondline edge and the moisture reservoir such that the film prevents interfacing between the bondline edge and the moisture reservoir;

wetting the moisture reservoir with the predetermined amount of moisture such that, responsive to the wetting, the water vapor is released from the moisture reservoir and permeates the bondline edge;

enclosing the circumferential tread, the tire casing, and the moisture reservoir within an envelope, the envelope being positioned so as to extend within grooves of the circumferential tread; and removing air from the envelope to apply a pressure to the circumferential tread in a direction toward the tire casing such that an additional amount of moisture is released from the moisture reservoir and directed to the bondline edge to permeate the bondline edge, wherein the envelope is positioned within the grooves to reduce moisture circulation within the envelope, and wherein the film is coupled to the portion of the circumferential tread that is not covered by the moisture reservoir such that the envelope comes into contact with the film when air is removed from the envelope.

2. The method of claim 1, further comprising:

forming a precured tread strip having a generally planar mounting surface and a ground-contacting opposing surface opposite and parallel to the generally planar mounting surface; and vulcanizing two ends of the precured tread strip together to form the circumferential tread.

3. A method of retreading a tire without the use of a curing chamber for vulcanizing rubber, the method comprising:

determining a predetermined amount of moisture associated with controlling a release of water vapor during curing of an adhesive within an envelope;

applying a primer to an inner surface of a circumferential tread and applying the primer to an outer surface of a tire casing;

applying an adhesive to the primer disposed on at least one of the inner surface and the outer surface;

applying the circumferential tread to the tire casing;

coupling a moisture reservoir to the circumferential tread such that at least a portion of the circumferential tread is not covered by the moisture reservoir;

interposing a film between the bondline edge and the moisture reservoir such that the film prevents interfacing between the bondline edge and the moisture reservoir;

wetting the moisture reservoir with the predetermined amount of moisture such that, responsive to the wetting, the water vapor is released from the moisture reservoir;

enclosing the tire casing, the circumferential tread, and the moisture reservoir in the envelope, the envelope being positioned so as to extend within grooves of the circumferential tread; and removing air from the envelope to apply a pressure to the circumferential tread in a direction toward the tire casing such that an additional amount of moisture is released from the moisture reservoir and directed to the bondline edge to permeate the bondline edge, wherein the envelope is positioned within the grooves to reduce moisture circulation within the envelope, and wherein the film is coupled to the portion of the circumferential tread that is not covered by the moisture reservoir such that the envelope comes into contact with the film when air is removed from the envelope.

4. The method of claim 3, further comprising:
curing the adhesive at a temperature of 40-130 degrees Fahrenheit, inclusive.

5. The method of claim 4, further comprising:
curing the adhesive for 24 hours.

6. The method of claim 4, further comprising:
applying a pressure of 40-100 PSI to the circumferential tread as the adhesive is curing.

7. The method of claim 3, further comprising, prior to applying the circumferential tread to the tire casing, misting the adhesive with an adhesive reactant.

8. The method of claim 3, wherein coupling the moisture reservoir to the circumferential tread further comprises covering the entirety of the circumferential tread with the moisture reservoir such that the moisture reservoir is interposed between the envelope and the circumferential tread about an entire circumference of the circumferential tread.

9. The method of claim 3, further comprising:
forming a precured tread having a first end and a second end opposite the first end;
applying the primer to the first end and the second end;
applying the adhesive to the first end and the second end; and
curing the adhesive to form the circumferential tread.

10. A method of retreading a tire without the use of a curing chamber for vulcanizing rubber, the method comprising:

determining a predetermined amount of moisture associated with controlling a release of water vapor during curing of an adhesive within an envelope;

forming a precured tire tread having a first end and a second end;

splicing the first end and the second end to form a circumferential tread having an inner surface and a road-contacting outer surface;

applying a primer to the entirety of the inner surface;

applying a moisture-curing adhesive to the entirety of the inner surface;

applying the circumferential tread to a tire casing so a bondline edge forms circumferentially about the tire casing;

wetting a moisture reservoir with the predetermined amount of moisture such that, responsive to the wetting, the water vapor is released from the moisture reservoir and permeates the bondline edge for curing the moisture-curing adhesive;

enclosing the circumferential tread, the tire casing, and the moisture reservoir within the envelope, the envelope being positioned so as to extend within grooves of the circumferential tread;

positioning the moisture reservoir proximate to the bondline edge within the envelope such that at least a portion of the circumferential tread is not covered by the moisture reservoir;

interposing a film between the bondline edge and the moisture reservoir such that the film prevents interfacing between the bondline edge and the moisture reservoir and removing air from the envelope to apply a pressure to the circumferential tread in a direction toward the tire casing such that an additional amount of moisture is released from the moisture reservoir and directed to the bondline edge to permeate the bondline edge, wherein the envelope is positioned within the grooves to reduce moisture circulation within the envelope, and wherein the film is coupled to the portion of the circumferential tread that is not covered by the moisture reservoir such that the envelope comes into contact with the film when air is removed from the envelope.

11. The method of claim 10, wherein the tire casing comprises a buffed mounting surface, the method further comprising:
   applying the primer to the buffed mounting surface; and
   applying the moisture-curing adhesive to the primer disposed on the buffed mounting surface.

12. The method of claim 10, wherein the moisture reservoir is a textile coupled to the circumferential tread.

13. The method of claim 12, further comprising:
   coupling the textile to the road-contacting outer surface of the circumferential tread; and
   positioning a portion of the textile proximate to the bondline edge.

14. The method of claim 13, further comprising positioning a belt about the road-contacting outer surface and the textile, the belt applying a circumferentially inward force on the textile in a direction toward the circumferential tread.

15. The method of claim 10, wherein the precured tire tread has a tread pattern profiled across a road-contacting surface, the method further comprising:
   splicing the first end and the second end so the tread pattern repeats infinitely circumferentially about the road-contacting outer surface of the circumferential tread.

* * * * *